US011695958B2

(12) United States Patent
Chao et al.

(10) Patent No.: US 11,695,958 B2
(45) Date of Patent: Jul. 4, 2023

(54) METHOD AND APPARATUS FOR ENCODING/DECODING VIDEO SIGNAL BY USING EDGE-ADAPTIVE GRAPH-BASED TRANSFORM

(71) Applicants: LG ELECTRONICS INC., Seoul (KR); UNIVERSITY OF SOUTHERN CALIFORNIA, Los Angeles, CA (US)

(72) Inventors: Yung-Hsuan Chao, Los Angeles, CA (US); Hilmi E. Egilmez, Los Angeles, CA (US); Antonio Ortega, Los Angeles, CA (US); Sehoon Yea, Seoul (KR); Bumshik Lee, Seoul (KR)

(73) Assignees: LG ELECTRONICS INC., Seoul (KR); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 635 days.

(21) Appl. No.: 16/074,265

(22) PCT Filed: Feb. 1, 2017

(86) PCT No.: PCT/KR2017/001052
§ 371 (c)(1),
(2) Date: Apr. 8, 2021

(87) PCT Pub. No.: WO2017/135662
PCT Pub. Date: Aug. 10, 2017

(65) Prior Publication Data
US 2021/0227261 A1    Jul. 22, 2021

Related U.S. Application Data

(60) Provisional application No. 62/289,910, filed on Feb. 1, 2016.

(51) Int. Cl.
*H04N 11/02* (2006.01)
*H04N 19/61* (2014.01)
(Continued)

(52) U.S. Cl.
CPC .......... *H04N 19/61* (2014.11); *H04N 19/107* (2014.11); *H04N 19/124* (2014.11); *H04N 19/13* (2014.11); *H04N 19/14* (2014.11); *H04N 19/182* (2014.11)

(58) Field of Classification Search
CPC .... H04N 19/61; H04N 19/107; H04N 19/124; H04N 19/13; H04N 19/14; H04N 19/182
(Continued)

(56) References Cited

U.S. PATENT DOCUMENTS 5,737,449 A * 4/1998 Lee .......................... G06T 9/20
382/242
10,771,518 B2 * 9/2020 Nowak ............... H04L 65/4069
(Continued)

FOREIGN PATENT DOCUMENTS

JP        2014-007477 A     1/2014
KR    1020110093532 A     8/2011
(Continued)

OTHER PUBLICATIONS

International Search Report from PCT/KR2017/001052, dated May 31, 2017.

*Primary Examiner* — Jayanti K Patel
*Assistant Examiner* — Richard B Carter
(74) *Attorney, Agent, or Firm* — Dentons US LLP

(57) ABSTRACT

The present invention provides a method for encoding a video signal based on an Edge Adaptive Graph-Based Transform (EA-GBT) including detecting a step edge or a ramp edge from a residual signal; generating a graph signal based on at least one of the step edge or the ramp edge; obtaining an EA-GBT coefficient by performing the EA-GBT for the graph signal; quantizing the EA-GBT coefficient; and entropy-encoding the quantized EA-GBT coefficient.

10 Claims, 21 Drawing Sheets

(51) Int. Cl.
　　　*H04N 19/107*　　　(2014.01)
　　　*H04N 19/124*　　　(2014.01)
　　　*H04N 19/13*　　　(2014.01)
　　　*H04N 19/14*　　　(2014.01)
　　　*H04N 19/182*　　　(2014.01)

(58) Field of Classification Search
　　　USPC ............ 375/240.12, 240.02, 240.18, 240.29;
　　　　　　　　　　　　　　　　　　　　　　　　　　　382/242
　　　See application file for complete search history.

(56) References Cited

U.S. PATENT DOCUMENTS

| | | | | |
|---|---|---|---|---|
| 2013/0272422 A1* | 10/2013 | Lee | ...................... | H04N 19/122 |
| | | | | 375/240.18 |
| 2013/0279577 A1* | 10/2013 | Schwarz | ................ | H04N 19/70 |
| | | | | 375/240.12 |
| 2014/0192904 A1* | 7/2014 | Rosewarne | ............ | H04N 19/86 |
| | | | | 375/240.29 |
| 2014/0204999 A1* | 7/2014 | Park | ...................... | H04N 19/136 |
| | | | | 375/240.02 |
| 2015/0189276 A1* | 7/2015 | Sugimoto | ............ | H04N 19/172 |
| | | | | 375/240.02 |

FOREIGN PATENT DOCUMENTS

| | | |
|---|---|---|
| KR | 1020110135787 A | 12/2011 |
| KR | 1020140119822 A | 10/2014 |
| WO | 2015009039 A1 | 1/2015 |

* cited by examiner (a)

| Methods | Size | Ramp 8 × 8 | | Step 8 × 8 | |
|---|---|---|---|---|---|
| | | Δ PSNR (dB) | Δ rate (%) | Δ PSNR (dB) | Δ rate (%) |
| BQmall | 832 × 480 | 0.23 | -4.04 | 0.24 | -4.20 |
| Basketball Drill | 832 × 480 | 0.18 | -3.82 | 0.18 | -3.87 |
| City | 704 × 576 | 0.21 | -3.37 | 0.23 | -3.60 |
| Crew | 704 × 576 | 0.10 | -2.04 | 0.11 | -2.33 |
| Harbour | 704 × 576 | 0.21 | -2.84 | 0.24 | -3.26 |
| Soccer | 704 × 576 | 0.20 | -2.88 | 0.24 | -3.37 |
| Average | | 0.19 | -3.17 | 0.21 | -3.44 |
| Methods | Size | Ramp 16 × 16 | | Step 16 × 16 | |
| | | Δ PSNR (dB) | Δ rate (%) | Δ PSNR (dB) | Δ rate (%) |
| BQmall | 832 × 480 | 0.35 | -6.20 | 0.37 | -6.65 |
| Basketball Drill | 832 × 480 | 0.18 | -4.24 | 0.22 | -5.11 |
| City | 704 × 576 | 0.25 | -4.35 | 0.27 | -4.91 |
| Crew | 704 × 576 | 0.14 | -3.41 | 0.15 | -3.64 |
| Harbour | 704 × 576 | 0.24 | -3.46 | 0.24 | -3.51 |
| Soccer | 704 × 576 | 0.21 | -3.10 | 0.22 | -3.34 |
| Average | | 0.23 | -4.13 | 0.25 | -4.53 |

FIG. 21

| Methods | Size | Ramp 8 × 8 | | Step 8 × 8 | |
|---|---|---|---|---|---|
| | | Δ PSNR (dB) | Δ rate (%) | Δ PSNR (dB) | Δ rate (%) |
| BQmall | 832 × 480 | 0.29 | -3.40 | 0.27 | -3.16 |
| Basketball Drill | 832 × 480 | 0.16 | -2.69 | 0.15 | -2.58 |
| City | 704 × 576 | 0.20 | -2.13 | 0.14 | -1.48 |
| Crew | 704 × 576 | 0.08 | -1.52 | 0.06 | -1.26 |
| Harbour | 704 × 576 | 0.21 | -2.21 | 0.15 | -1.58 |
| Soccer | 704 × 576 | 0.20 | -1.98 | 0.13 | -1.32 |
| Average | | 0.19 | -2.32 | 0.15 | -1.90 |
| Methods | Size | Ramp 16 × 16 | | Step 16 × 16 | |
| | | Δ PSNR (dB) | Δ rate (%) | Δ PSNR (dB) | Δ rate (%) |
| BQmall | 832 × 480 | 0.48 | -5.43 | 0.40 | -4.61 |
| Basketball Drill | 832 × 480 | 0.15 | -2.57 | 0.13 | -2.22 |
| City | 704 × 576 | 0.24 | -2.55 | 0.23 | -2.40 |
| Crew | 704 × 576 | 0.13 | -2.80 | 0.11 | -2.38 |
| Harbour | 704 × 576 | 0.29 | -2.96 | 0.26 | -2.63 |
| Soccer | 704 × 576 | 0.22 | -2.25 | 0.21 | -2.15 |
| Average | | 0.25 | -3.09 | 0.22 | -2.73 |

METHOD AND APPARATUS FOR ENCODING/DECODING VIDEO SIGNAL BY USING EDGE-ADAPTIVE GRAPH-BASED TRANSFORM

CROSS-REFERENCE TO RELATED APPLICATIONS

This application is the National Stage filing under 35 U.S.C. 371 of International Application No. PCT/KR2017/001052, filed on Feb. 1, 2017, which claims the benefit of U.S. Provisional Applications No. 62/289,910, filed on Feb. 1, 2016, the contents of which are all hereby incorporated by reference herein in their entirety.

TECHNICAL FIELD

The present invention relates to a method and apparatus for encoding and decoding a video signal by using Edge Adaptive Graph-Based Transform (hereinafter, referred to as 'EA-GBT'). Particularly, the present invention relates to a technique of designing EA-GBT based on at least one of step edge model or ramp edge model.

BACKGROUND ART

Next-generation video content will have features of high spatial resolution, a high frame rate, and high dimensionality of scene representation. Processing such content will result in a tremendous increase in terms of memory storage, a memory access rate, and processing power. Therefore, there is a need to design a coding tool for processing next-generation video content more efficiently.

Discrete Cosine Transform (hereinafter, 'DCT') is widely used for image and video compression. The DCT provides efficient coding for an image including a vertical edge or a horizontal edge. However, in the case of an image to which the DCT is not applied well, for example, in the case that block signals have complex edge structures such as diagonal edges, it may not be efficient to use the DCT. Accordingly, it is required to provide a method available to perform modeling of a graph more flexibly for edges having various directions.

DISCLOSURE

Technical Problem

The present invention is to provide Edge Adaptive Graph-Based Transform (hereinafter, referred to as 'EA-GBT') method which is available to perform modeling of a graph more flexibly for edges having various directions.

In addition, the present invention is to improve a coding performance of an inter-prediction residual signal and an intra-prediction residual signal.

In addition, the present invention is to provide a method of designing the EA-GBT based on at least one of step edge model or ramp edge model.

In addition, the present invention is to provide a method of detecting a ramp edge.

In addition, the present invention is to provide an arithmetic ramp edge coding ((hereinafter, referred to as 'AREC') method.

Technical Solution

The present invention provides an EA-GBT method available to perform modeling of a graph more flexibly for edges having various directions.

In addition, the present invention provides a method for generating a graph signal based on at least one of a step edge or a ramp edge.

In addition, the present invention provides an arithmetic ramp edge coding method by using a center ramp pixel.

In addition, the present invention provides a method for encoding a position of a center ramp pixel.

In addition, the present invention provides a method for detecting at least one of a step edge or a ramp edge from a residual signal.

In addition, the present invention provides a method for designing EA-GBT based on ramp edge model.

In addition, the present invention proposes a method for determining a transform scheme based on Rate-Distortion cost of DCT or EA-GBT

Technical Effects

According to the present invention, the EA-GBT method is provided, and modeling of a graph is available more flexibly for edges having various directions.

In addition, EA-GBT is designed based on ramp edge model, and signaling overhead may be decreased, and more efficient coding may be performed in comparison with the existing DCT-based coding.

In addition, according to the present invention, bit rate may be decreased for an inter-prediction residual signal and an intra-prediction residual signal. Further, as a size of a transform unit is increased, it may be identified that EA-GBT performance to which the present invention is applied is improved.

DESCRIPTION OF DRAWINGS

FIG. 19(a) illustrates an image block having a ramp structure and FIG. 19(b) illustrates a position (denoted by a dotted line) of a weak link weight predicted from a center ramp pixel.

FIGS. 20 and 21 illustrate a comparison table of PSNR gain and bit rate decreasing ratio of the EA-GBT based on a step function and the EA-GBT based on a ramp function in comparison with the DCT with respect to an inter-prediction residual signal or an intra-prediction residual signal, as an embodiment to which the present invention is applied.

BEST MODE FOR INVENTION

Figure 1:
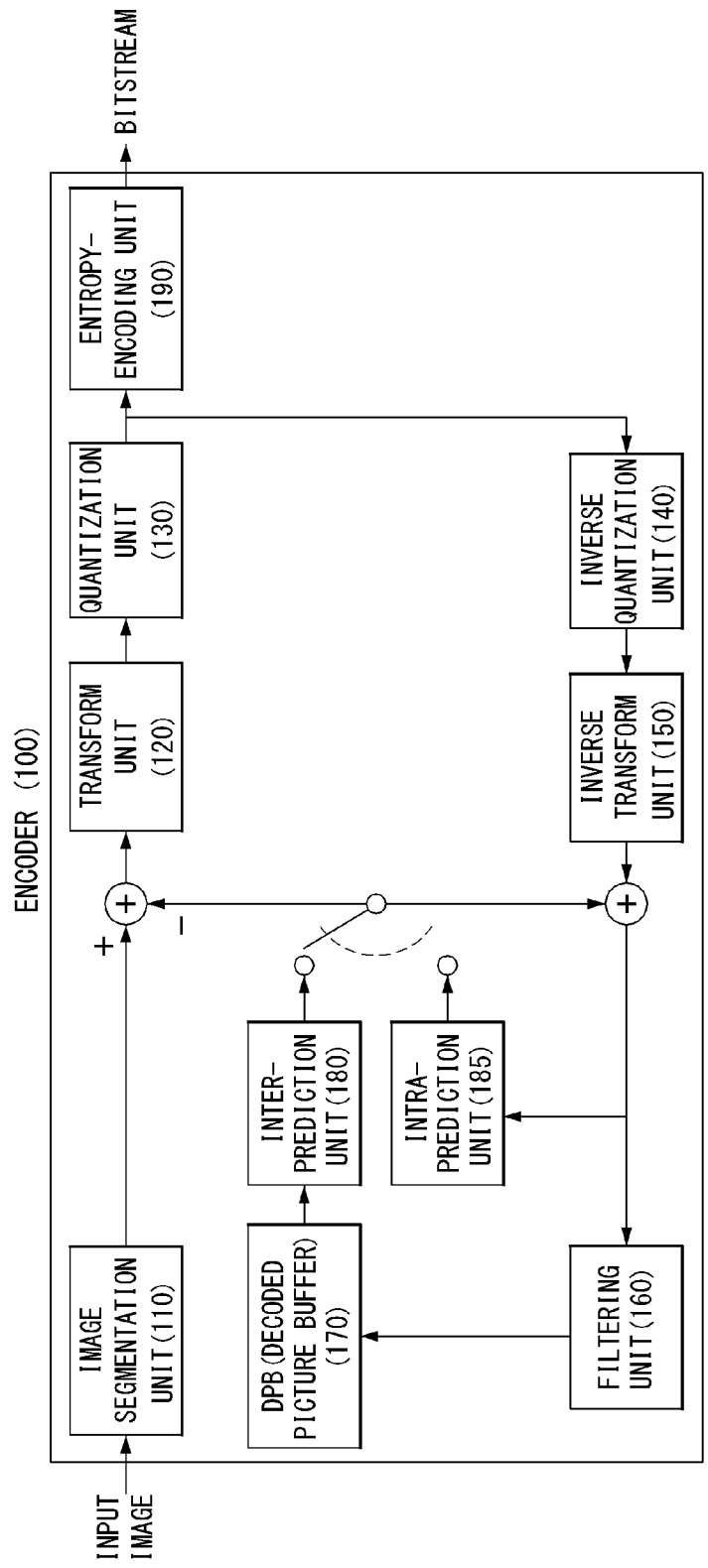
FIG. 1 shows a schematic block diagram of an encoder for encoding a video signal according to one embodiment of the present invention.

The present invention provides a method for encoding a video signal based on an Edge Adaptive Graph-Based Transform (EA-GBT) including detecting a step edge or a ramp edge from a residual signal; generating a graph signal based on at least one of the step edge or the ramp edge; obtaining an EA-GBT coefficient by performing the EA-GBT for the graph signal; quantizing the EA-GBT coefficient; and entropy-encoding the quantized EA-GBT coefficient.

In addition, in the present invention, when the residual signal is an inter-prediction residual signal, the graph signal is generated based on the step edge.

In addition, in the present invention, when the residual signal is an intra-prediction residual signal, the graph signal is generated based on the ramp edge.

In addition, in the present invention, generating a graph signal includes: searching a center ramp pixel having a gradient greater than a threshold value; and encoding a position of the center ramp pixel.

In addition, in the present invention, encoding the position of the center ramp pixel includes: initializing the position of the center ramp pixel; searching the position of the center ramp pixel with five possible directions according to a priority; allocating a probability for each direction information; and encoding the direction information with the allocated probability, and the direction information represents a direction of progress between two consecutive pixels.

In addition, in the present invention, the method further includes determining a mode index corresponding to the EA-GBT; and entropy-encoding the mode index.

In addition, in the present invention, the method further includes obtaining a DCT coefficient by performing a DCT for the residual signal; and comparing the DCT coefficient with Rate-Distortion cost of the EA-GBT coefficient, when the Rate-Distortion cost of the EA-GBT coefficient is smaller than the Rate-Distortion cost of the DCT coefficient, a mode index corresponding to the EA-GBT is determined.

In addition, the present invention provides a method for decoding a video signal based on an Edge Adaptive Graph-Based Transform (EA-GBT) including extracting a residual signal and a mode index from the video signal; deriving the EA-GBT corresponding to the mode index; performing an inverse transform for the residual signal based on the EA-GBT; and generating a reconstructed signal by adding the inverse-transformed residual signal and a prediction signal.

In addition, in the present invention, the method further includes receiving a position of a center ramp pixel from the video signal, and the EA-GBT is derived based on the position of a center ramp pixel.

In addition, the present invention provides an apparatus for encoding a video signal based on an Edge Adaptive Graph-Based Transform (EA-GBT) including a detection unit configured to detect at least one of a step edge or a ramp edge from a residual signal; a graph signal generation unit configured to generate a graph signal based on at least one of the step edge or the ramp edge; a transform unit configured to obtain an EA-GBT coefficient by performing the EA-GBT for the graph signal; a quantization unit configured to quantize the EA-GBT coefficient; and an entropy-encoding unit configured to entropy-encode the quantized EA-GBT coefficient.

In addition, in the present invention, the graph signal generation unit is configured to search a center ramp pixel having a gradient greater than a threshold value, and encode a position of the center ramp pixel.

In addition, the present invention provides an apparatus for decoding a video signal based on an Edge Adaptive Graph-Based Transform (EA-GBT) including a parsing unit configured to extract a residual signal and a mode index from the video signal; an inverse transform unit configured to derive the EA-GBT corresponding to the mode index, and perform an inverse transform for the residual signal based on the EA-GBT; and a reconstruction unit configured to generate a reconstructed signal by adding the inverse-transformed residual signal and a prediction signal.

In addition, in the present invention, the parsing unit is configured to receive a position of a center ramp pixel from the video signal, and the EA-GBT is derived based on the position of a center ramp pixel.

MODE FOR INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process. Further, partitioning, decomposition, splitting, and split, etc. may also be appropriately substituted with each other for each coding process.

FIG. 1 shows a schematic block diagram of an encoder for encoding a video signal, according to one embodiment of the present invention.

Referring to FIG. 1, the encoder 100 may include an image split unit 110, a transform unit 120, a quantization unit 130, a dequantization unit 140, an inverse transform unit 150, a filtering unit 160, a decoded picture buffer (DPB) 170, an inter prediction unit 180, an intra prediction unit 185, and an entropy encoding unit 190.

The image split unit 110 may divide an input image (or a picture or a frame) input to the encoder 100 into one or more process units. For example, the process unit may be a coding tree unit (CTU), a coding unit (CU), a prediction unit (PU) or a transform unit (TU).

However, the terms are used only for convenience of illustration of the present invention. The present invention is not limited to the definitions of the terms. In this specification, for convenience of illustration, the term "coding unit" is used as a unit used in a process of encoding or decoding a video signal, but the present invention is not limited thereto. Another process unit may be appropriately selected based on the contents of the present invention.

The encoder 100 may generate a residual signal by subtracting a prediction signal output by the inter prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square or to a block of a variable size other than a square.

The transform unit 120 may use a Graph-Based signal processing scheme for processing inter-pixel relationship information by representing it as a graph. For example, the transform unit 120 may include a Graph-Based Transform (GBT) unit, and the GBT unit may detect at least one of a step edge or a ramp edge from a residual signal, generate a graph signal based on at least one of the step edge or the ramp edge, and obtain EA-GBT coefficient by performing EA-GBT for the graph signal. Here, the EA-GBT may mean a GBT obtained based on the graph of which edge weight is adjusted depending on an edge property of an image block. In addition, the EA-GBT mentioned in the present disclosure may mean EA-GBT generated based on least one of the step edge or the ramp edge, and can be interpreted appropriately according to each embodiment.

According to an embodiment of the present invention, in the case that the residual signal is an inter-prediction residual signal, it is characterized that the graph signal is generated based on the step edge. However, the present invention is not limited thereto, but the graph signal may be generated based on various edge models.

According to an embodiment of the present invention, in the case that the residual signal is an intra-prediction residual signal, it is characterized that the graph signal is generated based on the ramp edge. However, the present invention is not limited thereto, but the graph signal may be generated based on various edge models.

As an embodiment of the present invention, a step of generating a graph signal includes: searching a center ramp pixel having a gradient greater than a threshold value; and encoding a position of the center ramp pixel.

As an embodiment of the present invention, a step of encoding the position of the center ramp pixel includes: initializing the position of the center ramp pixel; searching the position of the center ramp pixel with five possible directions according to a priority; allocating a probability for each of direction information; and encoding the direction information with the allocated probability, and the direction information represents a direction of progress between two consecutive pixels.

As an embodiment of the present invention, the method further includes determining a mode index corresponding to the EA-GBT; and entropy-encoding the mode index.

As an embodiment of the present invention, the method further includes obtaining a DCT coefficient by performing a DCT for the residual signal; and comparing Rate-Distortion (RD) cost of the DCT coefficient with RD cost of the EA-GBT coefficient, when the RD cost of the EA-GBT coefficient is smaller than the RD cost of the DCT coefficient, a mode index corresponding to the EA-GBT is determined.

The graph-based transform unit to which the present invention is applied may be existed as a separate functional unit, and in this case, the graph-based transform unit may perform different function from that of the transform unit 120, but the present invention is not limited thereto.

The quantization unit 130 may quantize the transform coefficient and transmits the quantized coefficient to the entropy encoding unit 190. The entropy encoding unit 190 may entropy-code the quantized signal and then output the entropy-coded signal as bit streams.

The quantized signal output by the quantization unit 130 may be used to generate a prediction signal. For example, the quantized signal may be subjected to a dequantization and an inverse transform via the dequantization unit 140 and the inverse transform unit 150 in the loop respectively to reconstruct a residual signal. The reconstructed residual signal may be added to the prediction signal output by the inter prediction unit 180 or intra prediction unit 185 to generate a reconstructed signal.

Meanwhile, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter prediction unit 180.

The inter prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter prediction unit 180 may interpolate signals between pixels on a subpixel basis using a low-pass filter. In this case, the subpixel may mean a virtual pixel generated by applying an interpolation filter. An integer pixel means an actual pixel within the reconstructed picture. The interpolation method may include linear interpolation, bi-linear interpolation and Wiener filter, etc.

The interpolation filter may be applied to the reconstructed picture to improve the accuracy of the prediction. For example, the inter prediction unit 180 may apply the interpolation filter to integer pixels to generate interpolated pixels. The inter prediction unit 180 may perform prediction using an interpolated block composed of the interpolated pixels as a prediction block.

The intra prediction unit 185 may predict a current block by referring to samples in the vicinity of a block to be encoded currently. The intra prediction unit 185 may perform a following procedure to perform intra-prediction. First, the intra prediction unit 185 may prepare reference samples needed to generate a prediction signal. Thereafter, the intra prediction unit 185 may generate the prediction signal using the prepared reference samples. Thereafter, the intra prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction The prediction signal generated via the inter prediction unit 180 or the intra prediction unit 185 may be used to generate the reconstructed signal or used to generate the residual signal.

Figure 2:
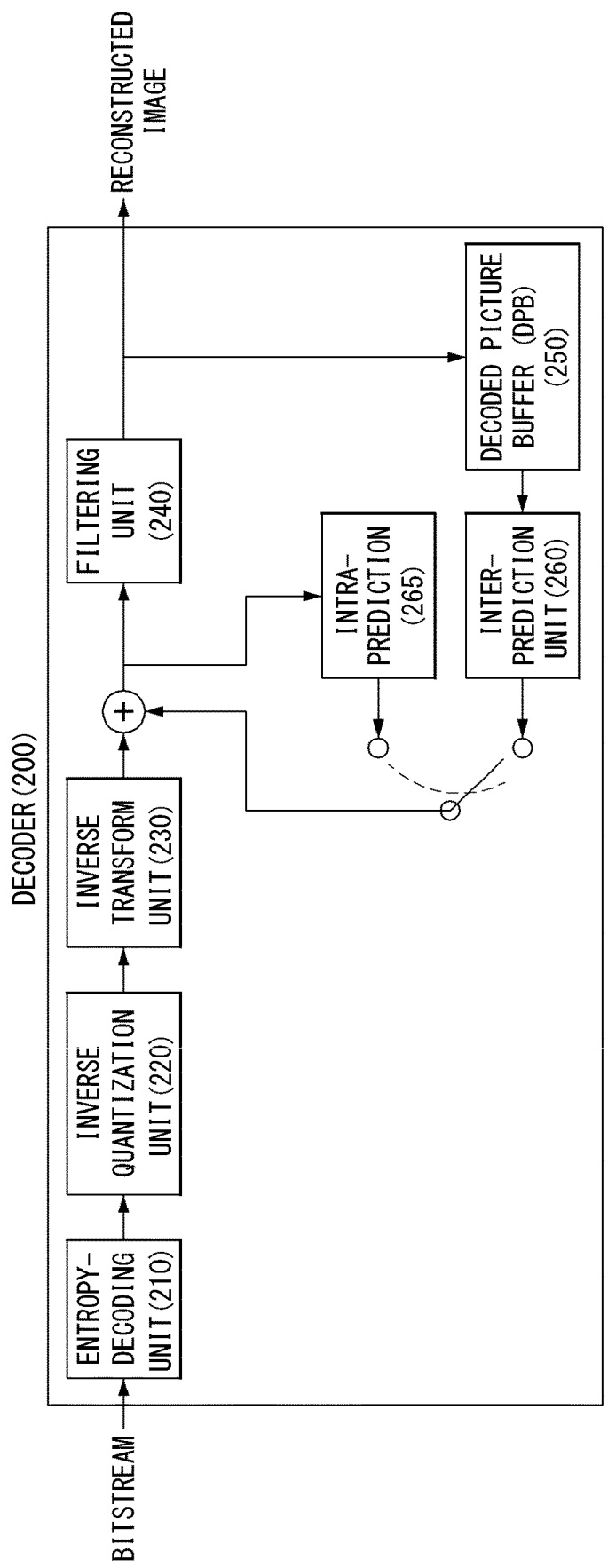
FIG. 2 shows a schematic block diagram of a decoder for decoding a video signal according to one embodiment of the present invention.

FIG. 2 shows a schematic block diagram of a decoder for decoding a video signal according to one embodiment of the present invention.

Referring to FIG. 2, the decoder 200 may include a parsing unit (not shown), an entropy decoding unit 210, a dequantization unit 220, an inverse transform unit 230, a filtering unit 240, a decoded picture buffer (DPB) 250, an inter prediction unit 260, an intra prediction unit 265 and a reconstruction unit (not shown).

A reconstructed video signal output by the decoder 200 may be reproduced using a reproducing device.

The decoder 200 may receive the signal output by the encoder as shown in FIG. 1. The received signal may be entropy-decoded via the entropy decoding unit 210.

As an embodiment, the decoder or the entropy decoding unit 210 may receive a mode index. Here, the mode index may correspond to a transform matrix optimized based on multiple graph-based models. For example, the mode index may represent a DCT matrix or an EA-GBT matrix.

The mode index may be entropy-decoded through the entropy decoding unit 210 and may be used for performing inverse transform in the inverse transform unit 230.

For example, the decoder may derive EA-GBT corresponding to the mode index, and perform inverse transform for the residual signal based on the EA-GBT. As an embodiment, the EA-GBT corresponding to the mode index may be prepared through off-line training in advance, and may be stored in the encoder or the decoder. The decoder may derive and use the transform corresponding to the mode index among the transforms store in advance.

However, the present invention is not limited thereto; for example, the mode index may not be an essential element for decoding of the present invention.

The dequantization unit 220 obtains a transform coefficient from an entropy-decoded signal using quantization step size. Here, the transform coefficient may mean DCT coefficient or EA-GBT coefficient, and may be that to which the various embodiments described in the transform unit 120 of FIG. 1 is applied.

The inverse transform unit 230 obtains a residual signal by inverse-transforming the transform coefficient. For example, EA-GBT may be used in the inverse transform, and the EA-GBT may mean EA-GBT which is generated based on at least one of a step edge or a ramp edge.

A reconstructed signal may be generated by adding the obtained residual signal to the prediction signal output by the inter prediction unit 260 or the intra prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter prediction unit 260.

Herein, detailed descriptions for the filtering unit 160, the inter prediction unit 180 and the intra prediction unit 185 of the encoder 100 may be equally applied to the filtering unit 240, the inter prediction unit 260 and the intra prediction unit 265 of the decoder 200 respectively.

Figure 3:
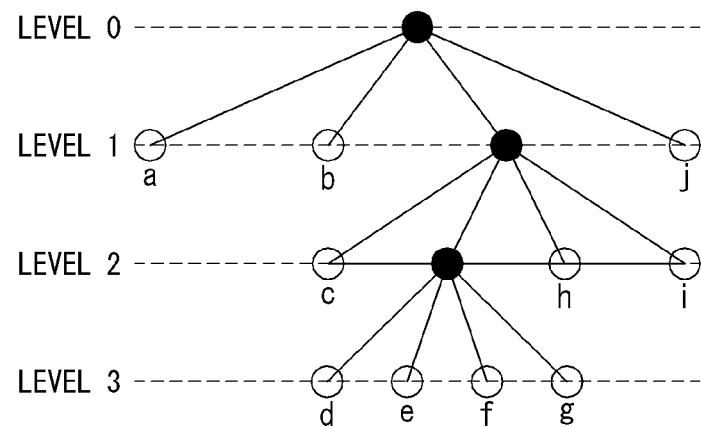
FIG. 3 is a diagram for illustrating a split structure of a coding unit according to one embodiment of the present invention.
Figure 3:
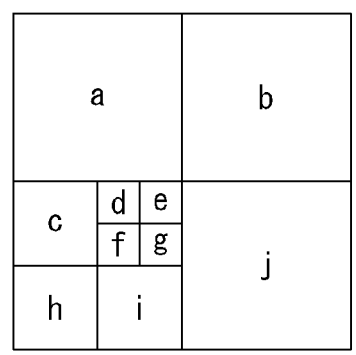

FIG. 3 is a diagram for illustrating a split structure of a coding unit, according to one embodiment of the present invention.

The encoder may split or divide one image or picture into a rectangular coding tree unit (CTU). Thereafter, the encoder may sequentially encode CTUs one by one according to the raster scan order.

For example, the size of a CTU may be set to 64×64, 32×32 or 16×16, but the present invention is not limited thereto. The encoder may select the size of a CTU based on resolution of an input image or the characteristics of an input image. A CTU may include a coding tree block (CTB) for a luma component and a coding tree block (CTB) for corresponding two chroma components.

A single CTU may be decomposed into a quad-tree (hereinafter referred to as "QT") structure. For example, one CTU may be divided into four units, each unit having a square shape, with a length of each side thereof decreasing by one half. This decomposition or division of the QT structure may be performed recursively.

Referring to FIG. 3, a root node of the QT may be related to the CTU. The QT may be partitioned until a leaf node is reached. In this case, the leaf node may be referred to as a coding unit (CU).

The CU may refer to a base unit for the coding process of an input image, for example, a base unit for intra/inter-predictions. The CU may include a CB for a luma component and a CB for two chroma components corresponding to the luma component. For example, the size of the CU may be set to 64×64, 32×32, 16×16 or 8×8. However, the present invention is not limited thereto. In the case of a high-resolution image, the size of the CU may be increased or varied.

Referring to FIG. 3, the CTU may correspond to the root node, and may have the smallest depth (i.e., level 0). Depending on the characteristics of the input image, the CTU may not be divided. In this case, the CTU corresponds to the CU.

The CTU may be decomposed into a QT form. As a result, sub-nodes, each having a depth of level 1, may be generated. Among the sub-nodes, each having a depth of level 1, a sub-node (i.e., a leaf node) that is not further divided corresponds to a CU. For example, in FIG. 3(b), each of the coding units CU(a), CU(b), and CU(j) corresponding to nodes a, b and j, respectively, is split in a CTU once, thus having a depth of level 1.

At least one of sub-nodes; each one having a depth of level 1 may be further split into a QT form. Among the sub-nodes, each having a depth of level 2, a sub-node (i.e., a leaf node) that is not further divided corresponds to a CU. For example, in FIG. 3(b), each of the coding units CU(c), CU(h), and CU(i) corresponding to nodes c, h and i respectively are partitioned two times in the CTU and thus has a depth of level 2.

Further, among the sub-nodes, each having a depth of level 2, at least one sub-node may be further split into a QT form. Among the sub-nodes, each having a depth of level 3, a sub-node (i.e., a leaf node) that is not further divided corresponds to a CU. For example, in FIG. 3(b), each of the coding units CU(d), CU(e), CU(f) and CU(g) corresponding to nodes d, e, f and g respectively are partitioned three times in the CTU and thus has a depth of level 3.

The encoder may determine a maximum or minimum size of the CU based on the characteristics (e.g., resolution) of the video image or the efficiency of coding. Information on the maximum or minimum size and/or information used for deriving the maximum or minimum size may be included in the bit stream. Hereinafter, a CU having a maximum size may be referred to as a LCU (Largest Coding Unit), while a CU having a minimum size may be referred to as a SCU (Smallest Coding Unit).

In addition, a CU having a tree structure may have a predetermined maximum depth information (or maximum level information) and may be hierarchically divided. Further, each divided CU may have depth information. The depth information indicates the number and/or degree of divisions of the CU. Thus, the depth information may include information about the size of the CU.

The LCU is divided into a QT form. Therefore, the size of the SCU may be obtained using the LCU size and the maximum depth information of the tree. Conversely, the size of the SCU and the maximum depth information of the tree may be used to determine the size of the LCU.

For a single CU, information indicating whether or not the CU is divided may be transmitted to the decoder. For example, the information may be defined as a split flag and may be represented by a syntax element "split_cu_flag." The split flag may be included in all CUs except a SCU. For example, when the value of the split flag is "1", the corresponding CU is further divided into four CUs. When the value of the split flag is "0", the corresponding CU is not further divided, and, then, the coding process for the corresponding CU may be performed.

In the embodiment shown in FIG. 3, although the QT structure described above is applied to the CU division by way of example, the QT structure described above may be equally applied to TU (transform unit) division, where the TU is a base unit for performing transform.

The TU may be hierarchically partitioned from the CU to be coded into a QT structure. For example, the CU may correspond to a root node of the tree for the transform unit TU.

The TU is divided into a QT structure. Thus, each of TUs divided from the CU may be further divided into smaller sub-TUs. For example, the size of the TU may be set to 32×32, 16×16, 8×8 or 4×4. However, the present invention is not limited thereto. For high-resolution images, the size of a TU may be larger or may vary.

For a single TU, information indicating whether or not the TU is divided may be transmitted to the decoder. For example, the information may be defined as a split transform flag and may be represented by a syntax element "split_transform_flag".

The split transform flag may be included in all TUs except the smallest TU (STU). For example, when the value of the split transform flag is "1", the corresponding TU is further divided into four TUs. When the value of the split transform flag is "0", the corresponding TU is not further divided, and, then, the coding process for the corresponding TU may be performed.

As described above, a CU is a base unit for the coding process in which the intra-prediction or inter-prediction is performed. In order to more effectively code the input image, the CU may be divided into PUs (Prediction Units).

A PU is a base unit forming a prediction block. It is possible to generate different prediction blocks on a PU basis even within a single CU. The PU may be divided differently depending on whether an intra-prediction mode or an inter-prediction mode is used as a coding mode for a CU to which the PU belongs.

Figure 4:
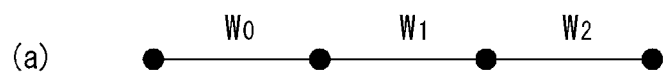
FIG. 4 is a diagram for illustrating a process of obtaining a graph-based transform matrix based on a one-dimensional graph or a two-dimensional graph according to one embodiment of the present invention.
Figure 4:
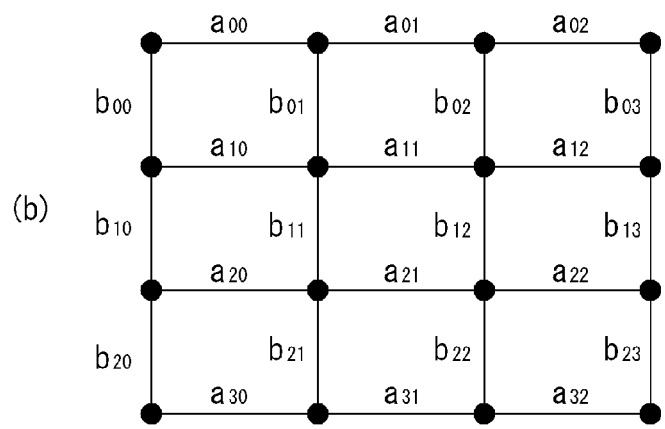

FIG. 4 is a diagram for illustrating a process of obtaining a graph-based transform matrix based on a one-dimensional graph and a two-dimensional graph, according to one embodiment of the present invention.

In an embodiment of the present invention, graph types that may be used to process a pixel block in an image may be described with reference to FIG. 4. For example, FIG. 4(a) indicates a one-dimensional graph corresponding to each line of the pixel block, while FIG. 4(b) indicates a two-dimensional graph corresponding to the pixel block.

A graph vertex may be associated with each pixel in the pixel block, and a value of the graph vertex may be represented by a pixel value. Further, a graph edge may refer to a line connecting the graph vertexes. The graph edge may be used to indicate what form statistical dependence in the signal has. A value representing an intensity of the statistical dependence may be called an edge weight.

For example, referring to FIG. 4(a) which indicates the one-dimensional graph, 0, 1, 2, and 3 represent positions of the vertexes respectively, and $w_0$, $w_1$, and $w_2$ represent weights of edges between the vertexes respectively. Referring to FIG. 4(b) which indicates the two-dimensional graph, $a_{ij}$ (i=0, 1, 2, 3, j=0, 1, 2) and $b_{kl}$ (k=0, 1, 2, l=0, 1, 2, 3) represent weights of edges between the vertexes respectively.

Each vertex may be connected to any other vertexes. An edge weight of zero may be assigned to an edge that connects non-associated or weakly-associated vertices. However, for simplicity of presentation, an edge with the edge weight of zero may be completely eliminated.

Definition of Graph-Based Transform (GBT)

In an embodiment of the present invention, a transform obtained from a graph signal may be defined as a graph-based transform (hereinafter referred to as a "GBT"). For example, provided that the relationship information between pixels constituting a TU is represented by a graph, the transform obtained from this graph may be referred to as the GBT.

The relationship information between the pixels may be defined in various ways. For example, the relationship information between the pixels may be defined based on similarities among pixel values of the pixels, based on whether the pixels belong to the same PU, based on whether the pixels belong to the same object, and the like. The inter-pixel relationship information may be defined based on edge presence/absence between the pixels and edge weight values between the pixels when each of the pixels is matched to the vertex of the graph.

In this case, the GBT may be obtained through the following procedures. For example, an encoder or a decoder may obtain graph information from a target block of a video signal. When a graph g(A,S) to which a weight is applied is given, from the graph information, Laplacian matrix L may be obtained as represented in Equation 1 below.

$$L = D - A + S \quad \text{[Equation 1]}$$

In Equation 1 above, D represents a degree matrix. For example, the degree matrix may mean a diagonal matrix including the information of a degree of each vertex. 'A' represents an adjacency matrix that represents the interconnection (e.g., edge) with an adjacent pixel by a weight. 'S' represents a diagonal matrix that represents self-loop in nodes of G.

And, with respect to the Laplacian matrix L, a GBT kernel may be obtained by performing an eigen decomposition as represented in Equation 2 below.

$$L = U \Lambda U^T \quad \text{[Equation 2]}$$

In Equation 2 above, L means a Laplacian matrix L, U means an eigen matrix, $\Lambda$ means a diagonal eigenvalue matrix, and $U^T$ means a transpose matrix of U. In Equation 2, the eigen matrix U may provide a graph-based Fourier transform specialized for a signal suitable for the corresponding model. For example, the eigen matrix U that satisfies Equation 2 may mean a GBT kernel.

Here, columns of the eigen matrix U may mean basis vectors of the GBT. When there is no self-loop in the graph, Laplacian matrix corresponds to the case that S=0 in Equation 1 above.

Definition of EA-GBT

First, it is assumed that a graph to which non-directional weight is applied is G=(V, E). In this case, a graph signal may be represented as $f \in \mathbb{R}^{|V|}$, and here, each signal value is associated with a node $v_i \in V$. A link $e_{i,j,w_{i,j}} \in E$ means a connection of nodes $V_i$ and $V_j$ with a weight $w_{i,j} \in [0,1]$ that represents a similarity between nodes.

The graph may be represented using adjacent matrix A that represents an interconnection (e.g., edge) with an adjacent pixel by a weight. Here, $A(i,j) = w_{i,j}$.

And, Laplacian matrix L may be defined as Equation 1 above, and L may be diagonalized through Equation 2 above.

As such, the graph transform corresponding to a graph designed based on edge information is referred to as EA-GBT.

The present invention provides a method of performing an optimal graph modeling (or edge modeling) for the EA-GBT. For example, based on a step model or a ramp model, a graph for an intra-prediction residual signal and an inter-prediction residual signal may be modeled. Through this, coding performance may be improved more efficiently.

Hereinafter, more detailed embodiments will be described.

Figure 5:
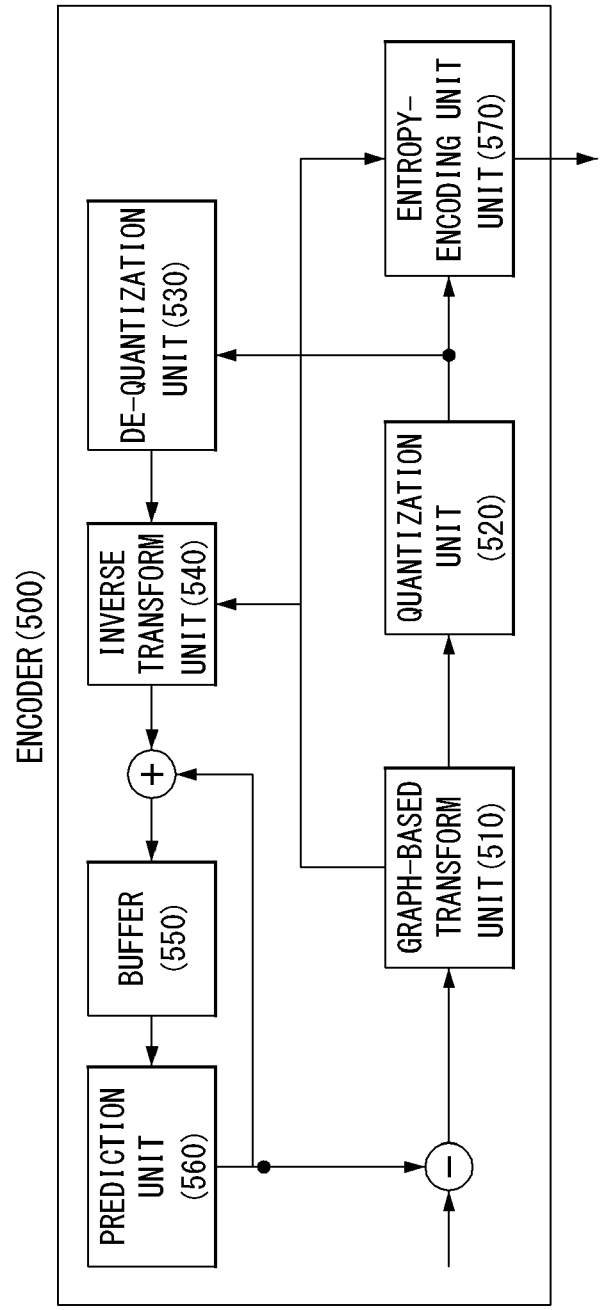
FIG. 5 shows a schematic block diagram of an encoder that processes graph-based signals, according to one embodiment of the present invention.

FIG. 5 illustrates a schematic block diagram of an encoder processing a graph-based signal, as an embodiment to which the present invention is applied.

The DCT provides an efficient coding for an image having a vertical edge or a horizontal edge. However, in the case of blocks having complex edge structures such as diagonal edges, it may not be efficient to use the DCT. Accordingly, the present invention provides a method that enables to model a graph for edges having various directions more flexibly.

Referring to FIG. 5, an encoder 500 to which the present invention is applied includes a graph-based transform unit 510, a quantization unit 520, a dequantization unit 530, an inverse transform unit 540, a buffer 550, a prediction unit 560 and an entropy encoding unit 570.

The encoder 500 receives a video signal, and generates a residual signal by subtracting a predicted signal outputted from the prediction unit 560 from the video signal.

The generated residual signal is transmitted to the graph-based transform unit 510, and the graph-based transform unit 510 applies a transform scheme to the residual signal, thereby generating a transform coefficient.

For example, the graph-based transform unit 510 may detect at least one of a step edge or a ramp edge from the residual signal, generate a graph signal based on at least one of the step edge or the ramp edge, and obtain an EA-GBT coefficient by performing the EA-GBT for the graph signal. Here, the EA-GBT may mean EA-GBT generated based on at least one of the step edge or the ramp edge.

In addition, this may be applied to other embodiments described in the present disclosure, and the repeated description will be omitted.

The quantization unit 520 transmits the quantized coefficient to the entropy encoding unit 570 by quantizing the generated EA-GBT coefficient.

The entropy encoding unit 570 performs entropy coding for the quantized signal and outputs the entropy-coded signal.

The quantized signal outputted from the quantization unit 520 may be used for generating a prediction signal. For example, the dequantization unit 530 and the inverse transform unit 540 in a loop of the encoder 500 may perform the dequantization and the inverse transformation for the quantized signal such that the quantized signal is restored to the residual signal. The restored signal may be generated by adding the restored residual signal to the prediction signal outputted by the prediction unit 560.

The buffer 550 stores the restored signal for a future reference of the prediction unit 560.

The prediction unit 560 may generate a prediction signal using the signal stored in the buffer 550.

Figure 6:
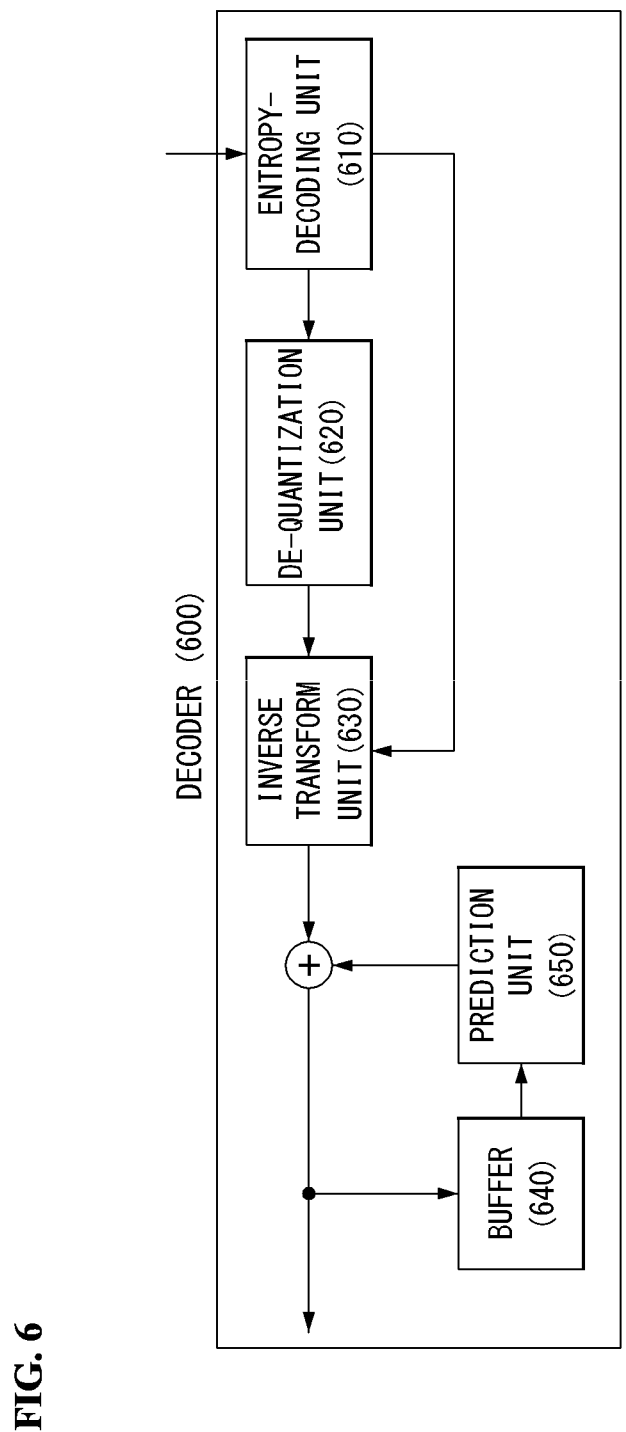
FIG. 6 shows a schematic block diagram of a decoder that processes graph-based signals according to one embodiment of the present invention.

FIG. 6 illustrates a schematic block diagram of a decoder processing a graph-based signal, as an embodiment to which the present invention is applied.

A decoder 600 shown in FIG. 6 may receive a signal outputted from the encoder 500, and obtain a residual signal from the received signal.

An entropy decoding unit 610 performs entropy decoding for a received signal. A dequantization unit 620 obtains a transformation coefficient from the entropy-decoded signal based on the information of a quantization step size. Here, the transformation coefficient may mean an EA-GBT coefficient.

An inverse transform unit 630 obtains a residual signal by performing inverse transformation for a transformation coefficient. In this case, the inverse transformation may mean an inverse transformation for the EA-GBT generated in the encoder 500. Here, the EA-GBT may mean EA-GBT generated based on at least one of the step edge or the ramp edge.

As another embodiment of the present invention, the decoder may receive a mode index that corresponds to the EA-GBT or the DCT, and obtain a graph-based transform matrix that corresponds to the mode index. By using the graph-based transform matrix, an inverse transform may be performed for the transform unit. Here, the graph-based transform matrix may represent an EA-GBT matrix or a DCT matrix.

For example, the decoder may derive EA-GBT corresponding to the mode index, and perform inverse transform for the residual signal based on the EA-GBT. As an embodiment, the EA-GBT corresponding to the mode index may be prepared through off-line training in advance, and may be stored in the encoder or the decoder. The decoder may derive and use the transform corresponding to the mode index among the transforms store in advance.

A restored signal may be generated by adding the obtained residual signal to the prediction signal outputted from a prediction unit 650.

A buffer 640 stores the restored signal for a future reference of the prediction unit 650.

The prediction unit 650 generates a prediction signal based on the signal stored in the buffer 640 which is restored previously.

Figure 7:
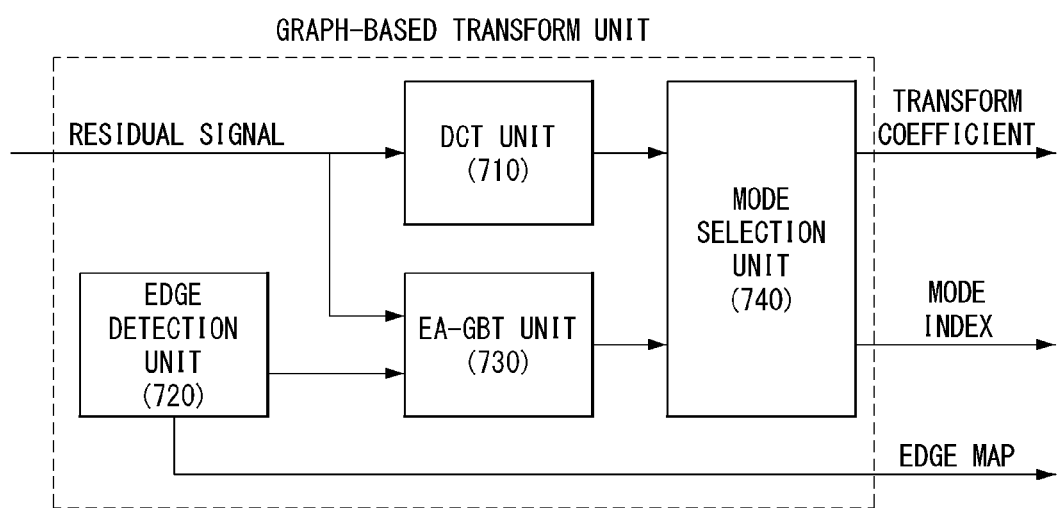
FIG. 7 illustrates an inner block diagram of a graph-based transform unit that performs the EA-GBT, as an embodiment to which the present invention is applied.

FIG. 7 illustrates an inner block diagram of a graph-based transform unit that performs the EA-GBT, as an embodiment to which the present invention is applied.

Referring to FIG. 7, the graph-based transform unit may include at least one of a DCT unit 710, an edge detection unit 720, an EA-GBT unit 730 and a mode selection unit 740. The unit may not be included essentially in an encoder, but information stored exterior may be used or the predefined information in an encoder may be used.

A clustering unit (not shown) may perform clustering for an input video data and generate at least one data cluster. In this case, the clustering may be performed based on a prediction mode. For example, in the case that the prediction mode is an intra-prediction mode, the at least one data cluster represents intra-residual data for the intra-prediction mode. Alternatively, in the case that prediction mode is an inter-prediction mode, the at least one data cluster represents inter-residual data for the inter-prediction mode.

A graph modeling unit (not shown) may generate multiple graph-based models that corresponds to data clusters, and generate graph Laplacian matrix that corresponds to the multiple graph-based models. In this case, each of the multiple graph-based models may be generated for the intra-prediction mode or the inter-prediction mode.

Referring to FIG. 7, first, the DCT unit 710 may obtain a DCT coefficient by performing the DCT for a residual signal.

The edge detection unit 720 may detect an edge from the residual signal and generate an edge map. Here, the residual signal may mean an intra-prediction residual signal or an inter-prediction residual signal. And, the edge may include at least one of a step edge or a ramp edge.

The EA-GBT unit 730 may generate a graph signal based on at least one of the step edge or the ramp edge, and obtain an EA-GBT coefficient by performing EA-GBT for the graph signal.

As an embodiment, in the case that the residual signal is an inter-prediction residual signal, the graph signal may be generated based on the step edge. And, in the case that the residual signal is an intra-prediction residual signal, the graph signal may be generated based on the ramp edge.

As another embodiment, the graph signal may be generated by searching a center ramp pixel that has a gradient greater than a threshold value, and encoding a position of the center ramp pixel.

At this time, the position of the center ramp pixel may be encoded according to the following process. For example, the position of the center ramp pixel may be initialized, the position of the center ramp pixel may be searched with five possible directions according to a priority, a probability of each of direction information may be allocated, and the direction information may be encoded with the allocated probability. Here, the direction information indicates a progress direction between two consecutive pixels.

The mode selection unit 740 may compare Rate-Distortion cost of a DCT coefficient obtained from the DCT unit 710 and an EA-GBT coefficient obtained from the EA-GBT unit 730, and select (or determine) any one transform scheme (or transform matrix) based on the result. For example, in the case that the Rate-Distortion cost of the EA-GBT coefficient is smaller than the DCT coefficient, the mode selection unit 40 may select the EA-GBT or the EA-GBT coefficient.

Accordingly, the encoder may perform quantization and entropy encoding for the corresponding transform coefficient.

Additionally, the mode selection unit 740 may signal the corresponding mode index. However, the present invention is not limited thereto, but the mode index may not be an essential element in the present invention.

Figure 8:
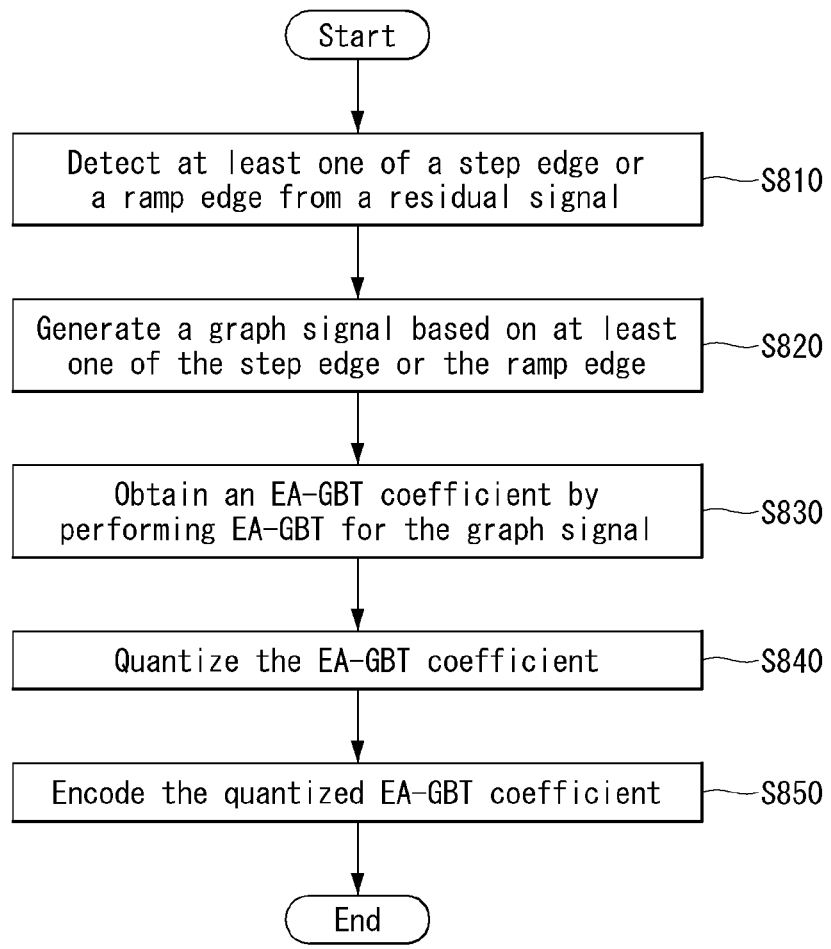
FIG. 8 is a flowchart for describing a process of performing encoding based on the EA-GBT, as an embodiment to which the present invention is applied.

FIG. 8 is a flowchart for describing a process of performing encoding based on the EA-GBT, as an embodiment to which the present invention is applied.

First, an encoder may detect at least one of a step edge or a ramp edge from a residual signal (step, S810).

The encoder may generate a graph signal based on at least one of the step edge or the ramp edge (step, S820).

The encoder may obtain an EA-GBT coefficient by performing EA-GBT for the graph signal (step, S830).

The encoder may quantize the EA-GBT coefficient (step, S840).

The encoder may encode the quantized EA-GBT coefficient (step, S850).

Figure 9:
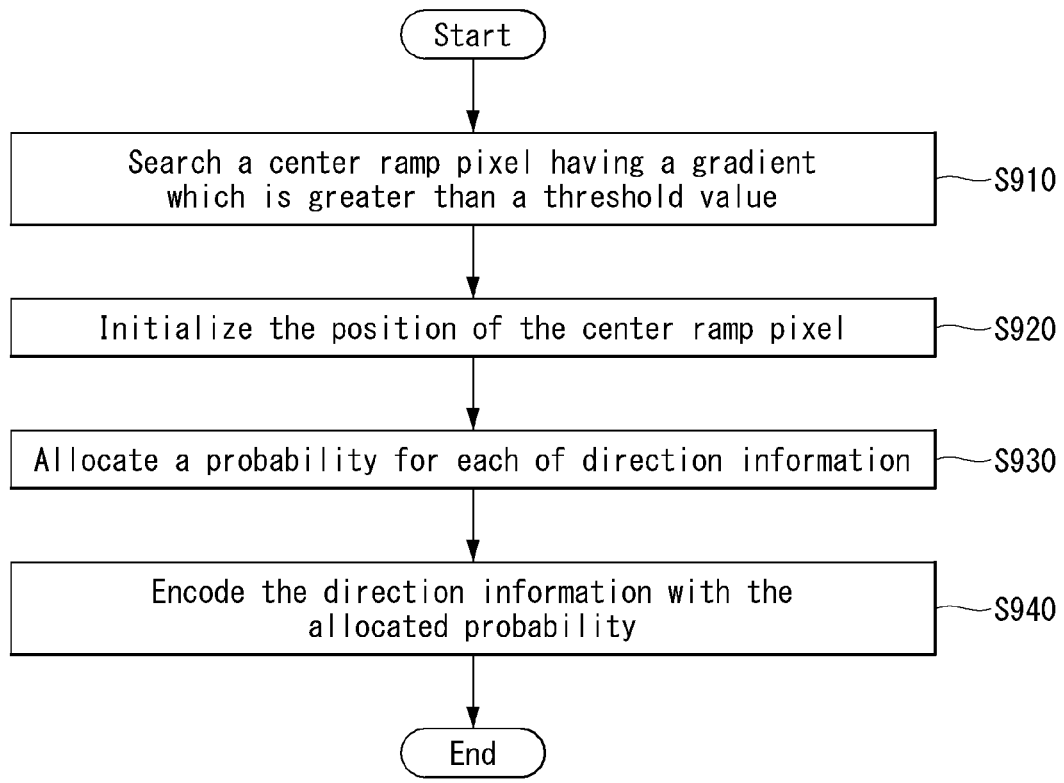
FIG. 9 is a flowchart for describing a process of performing arithmetic ramp edge coding, as an embodiment to which the present invention is applied.

FIG. 9 is a flowchart for describing a process of performing arithmetic ramp edge coding, as an embodiment to which the present invention is applied.

The present invention provides a method of detecting a ramp edge and performing the arithmetic ramp edge coding for the ramp edge.

First, in order to generate a graph signal, an encoder may search a center ramp pixel having a gradient which is greater than a threshold value (step, S910).

The encoder may encode a position of the center ramp pixel. Here, the encoding step may be performed by the following procedure.

The encoder may initialize the position of the center ramp pixel (step, S920). At this time, the encoder may search the position of the center ramp pixel in 5 possible directions according to a priority.

The encoder may allocate a probability for each of direction information (step, S930). Here, the direction information indicates a progress direction between two consecutive pixels.

The encoder may encode the direction information with the allocated probability (step, S940).

Figure 10:
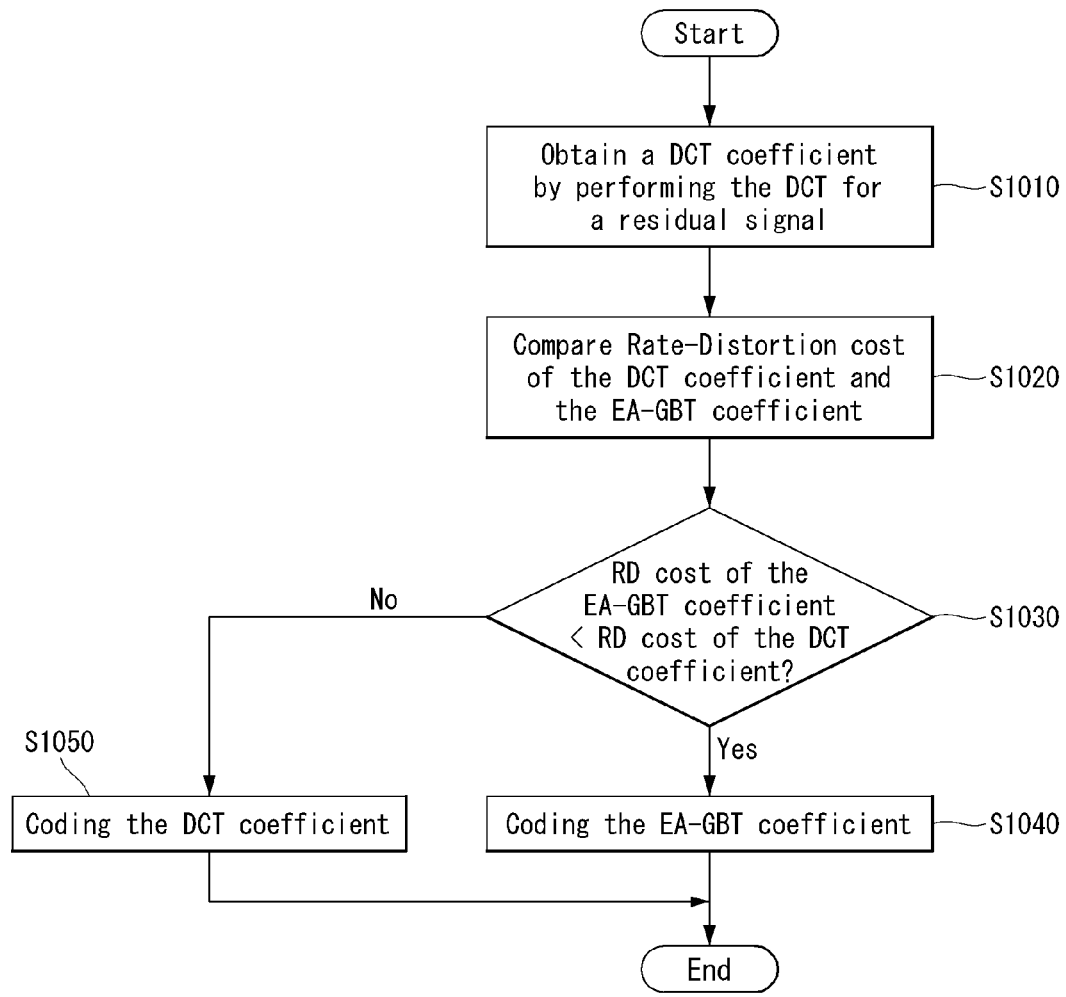
FIG. 10 is a flowchart for describing a method of determining a transform scheme based on Rate-Distortion cost of the DCT or the EA-GBT, as an embodiment to which the present invention is applied.

FIG. 10 is a flowchart for describing a method of determining a transform scheme based on Rate-Distortion cost of the DCT or the EA-GBT, as an embodiment to which the present invention is applied.

An encoder to which the present invention is applied may obtain a DCT coefficient by performing the DCT for a residual signal (step, S1010).

The encoder may compare the Rate-Distortion cost of the DCT coefficient and the EA-GBT coefficient (step, S1020), and based on the result, may select (or determine) either one of transform scheme (or transform matrix).

For example, in the case that the Rate-Distortion cost of the EA-GBT coefficient is smaller than the DCT coefficient (step, S1030), the encoder may select the EA-GBT or the EA-GBT coefficient. Accordingly, the encoder may perform a quantization and an entropy encoding for the corresponding transform coefficient (step, S1040).

Additionally, the encoder may signal the corresponding mode index corresponding to the EA-GBT. However, the present invention is not limited thereto, but the mode index may not be an essential element in the present invention.

On the contrary, as a result of the comparison, in the case that the Rate-Distortion cost of the EA-GBT coefficient is not smaller than the DCT coefficient (step, S1030), the encoder may select the DCT coefficient. Accordingly, the encoder may perform quantization and entropy encoding for the DCT coefficient (step, S1050).

Additionally, the encoder may signal the corresponding mode index corresponding to the DCT. However, the present invention is not limited thereto, but the mode index may not be an essential element in the present invention.

Figure 11:
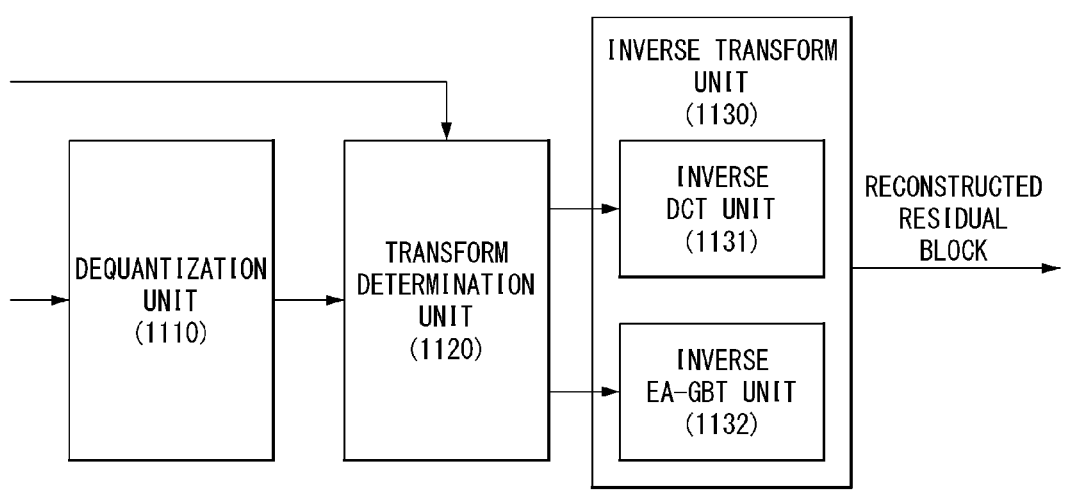
FIG. 11 illustrates a schematic block diagram of a decoder processing decoding based on the EA-GBT, as an embodiment to which the present invention is applied.

FIG. 11 illustrates a schematic block diagram of a decoder processing decoding based on the EA-GBT, as an embodiment to which the present invention is applied.

Referring to FIG. 11, a decoder may include at least one of a dequantization unit 1110, a transform determination unit 1120 and an inverse transform unit 1130, and the inverse transform unit 1130 may include at least one of an inverse DCT unit 1131 and an inverse EA-GBT unit 1132. The units may not be included in the decoder necessarily, but may use information stored exterior or predefined information in the decoder.

The dequantization unit 1110 may inverse-quantize an inverse-quantized transform coefficient, and obtain a transform coefficient.

The transform determination unit 1120 may determine a transform scheme to apply for the transform coefficient. At this time, the transform determination unit 1120 may determine a transform scheme based on at least one of an edge map or a mode index. For example, when the decoder receives an edge map, the transform determination unit 1120 may determine whether to apply DCT or EA-GBT based on the edge map.

As another example, based on the edge map, the decoder may determine whether to apply EA-GBT based on a step edge model or whether to apply EA-GBT based on a ramp edge model.

As another example, when the decoder receives a mode index, the decoder may derive a transform matrix corresponding to the mode index.

Based on the transform scheme determined by the transform determination unit 1120, the inverse transform unit 1130 may perform an inverse transform for the transform coefficient, and accordingly, may reconstruct a corresponding residual block.

For example, in the case that the transform determination unit 1120 determines to apply the DCT, the inverse DCT unit 1131 may perform an inverse DCT for the transform coefficient.

On the contrary, in the case that the transform determination unit 1120 determines to apply the EA-GBT, the inverse EA-GBT unit 1132 may perform an inverse EA-GBT for the transform coefficient.

Figure 12:
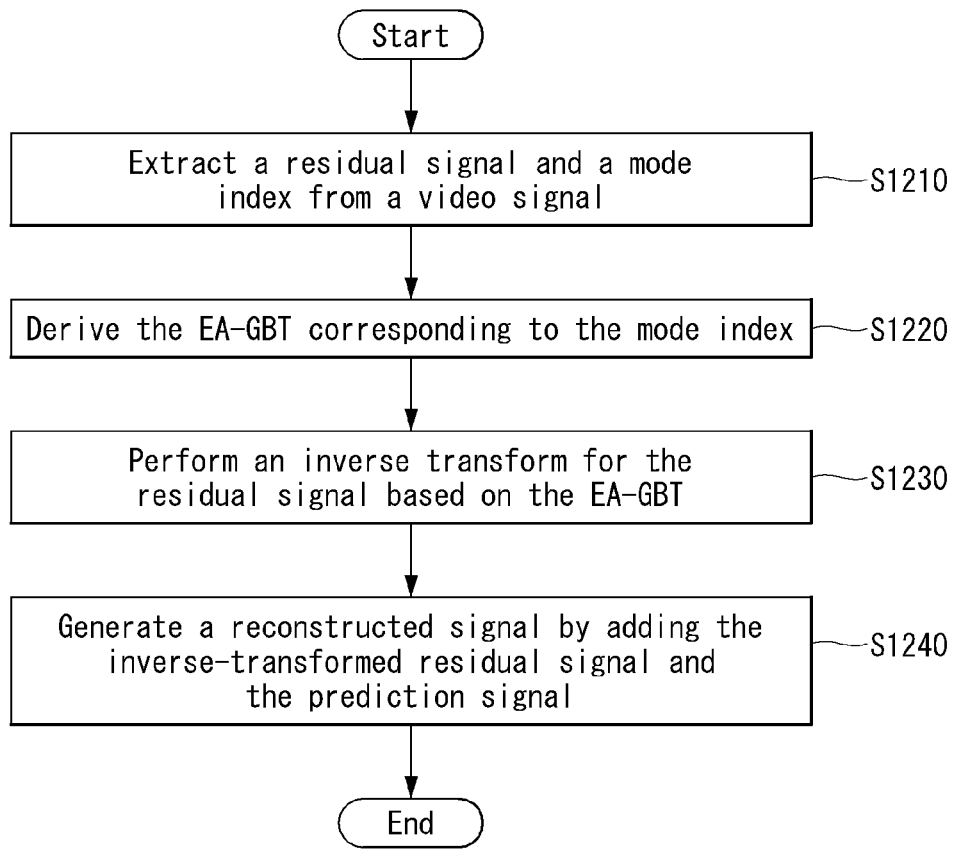
FIG. 12 is a flowchart for describing a process of performing decoding based on the EA-GBT, as an embodiment to which the present invention is applied.

FIG. 12 is a flowchart for describing a process of performing decoding based on the EA-GBT, as an embodiment to which the present invention is applied.

A decoder to which the present invention is applied may extract a residual signal and a mode index from a video signal (step, S1210).

The decoder may derive the EA-GBT corresponding to the mode index (step, S1220). At this time, in the case that the residual signal is an inter-prediction residual signal, the EA-GBT may be generated based on the step edge. In the case that the residual signal is an intra-prediction residual signal, the EA-GBT may be generated based on the ramp edge.

The decoder may perform an inverse transform for the residual signal based on the EA-GBT (step, S1230).

The decoder may generate a reconstructed signal by adding the inverse-transformed residual signal and the prediction signal (step, S1240).

Figure 13:
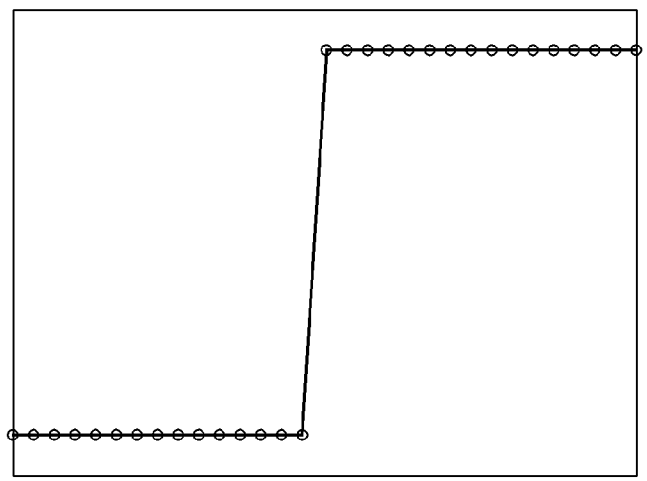
FIG. 13 illustrates a step function and a ramp function for the edge modeling, as an embodiment to which the present invention is applied.
Figure 13:
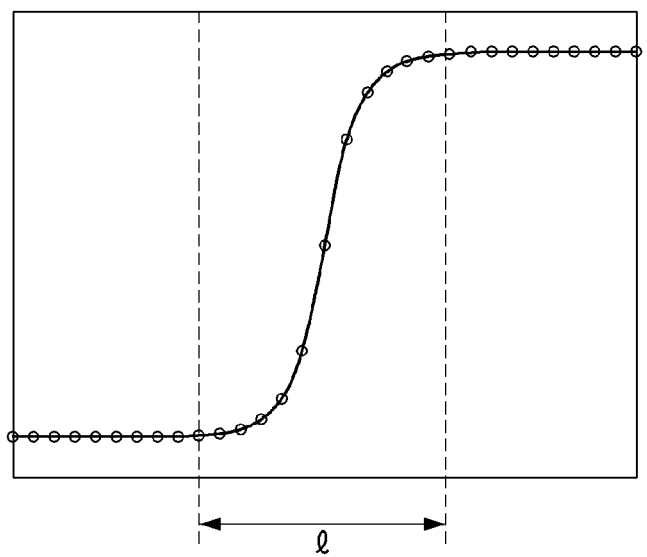

FIG. 13 illustrates a step function and a ramp function for the edge modeling, as an embodiment to which the present invention is applied.

The present invention provides the EA-GBT that applies the step edge model or the ramp edge model for an inter-prediction residual signal or an intra-prediction residual signal. According to an experiment of the present invention, as a result of using the two models, it is identified that bit rate of about 3% may be decreased in comparison with the DOT.

Referring to FIG. 13 above, a step function and a ramp function for the edge modeling are illustrated. The step edge represents a pattern of which brightness value is abruptly changed, and the ramp edge represents a pattern of which brightness value is slowly changed and maintains a predetermined value.

Ramp Edge Model

An optimal graph derivation for the EA-GBT is based on the assumption that a 1-dimensional signal having an edge can be modeled by Auto Regressive (hereinafter, referred to as 'AR') using a transmission between two pixels.

According to the present invention, modeling of 1-dimensional signal having an edge is performed by AR process using a sloped transition from pixel (i) toward pixel (i+l). Here, 'l' denotes a ramp width, and when $e_k \sim \mathcal{N}(0, \sigma_e^2)$ denotes independent and identically distributed (i.i.d.) Gaussian Noise, the corresponding model may be written as Equation 3 below.

$$x_1 = \epsilon$$
$$x_2 = \rho x_1 + e_2$$
$$\ldots$$
$$x_i = \rho x_{i-1} + e_i$$
$$x_{i+1} = \rho x_i + e_{i+1} + t_1$$
$$\ldots$$
$$x_{i+\ell} = \rho x_{i+(\ell-1)} + e_{i+\ell} + t_\ell$$
$$x_{i+(\ell+1)} = \rho x_{i+\ell} + e_{i+(\ell+1)}$$
$$\ldots$$
$$x_N = \rho x_{N-1} + e_N$$

[Equation 3]

Herein, an initial value is defined as $\epsilon \sim \mathcal{N}(0, \sigma_\epsilon^2)$, and a sloped transition is represented by a random gap $t_p \sim \mathcal{N}(m, \sigma_t^2)$. This may be represented by a matrix form such as $Fx = b$, as represented in Equation 4 below.

$$F = \begin{bmatrix} 1 & 0 & 0 & \cdots & \cdots & 0 \\ -\rho & 1 & 0 & \ddots & \ddots & \vdots \\ 0 & -\rho & 1 & \ddots & \ddots & \vdots \\ \vdots & \ddots & \ddots & \ddots & \ddots & \vdots \\ \vdots & \ddots & \ddots & -\rho & 1 & 0 \\ 0 & \cdots & \cdots & 0 & -\rho & 1 \end{bmatrix}, b = \begin{bmatrix} \epsilon \\ e_2 \\ e_3 \\ \vdots \\ \vdots \\ e_N \end{bmatrix} + \begin{bmatrix} 0 \\ \vdots \\ t_1 \\ \vdots \\ t_\ell \\ \vdots \\ 0 \end{bmatrix}$$

[Equation 4]

Herein, since an inverse transform is available for F, a signal may be represented as $X = F^{-1}b$.

Meanwhile, an optimal transform may be derived by approximating Karhunen-Loeve transform (hereinafter, referred to as 'KLT'). For this, according to the present invention, a covariance matrix of x may be calculated as Equation 5 below.

$$C = \sigma_e^2 F^{-1} \begin{bmatrix} \frac{\sigma_\epsilon^2}{\sigma_e^2} & 0 & \cdots & \cdots & \cdots & \cdots & 0 \\ 0 & 1 & \ddots & \ddots & \ddots & \ddots & \vdots \\ \vdots & \ddots & \ddots & \ddots & \ddots & \ddots & \vdots \\ \vdots & \ddots & \ddots & 1+\alpha_i & 0 & \ddots & \vdots \\ \vdots & \ddots & \ddots & 0 & \ddots & 0 & \vdots \\ \vdots & \ddots & \ddots & \ddots & 0 & 1+\alpha_t & \ddots & \vdots \\ \vdots & \ddots & \ddots & \ddots & \ddots & \ddots & 0 \\ 0 & \cdots & \cdots & \cdots & \cdots & \cdots & 0 & 1 \end{bmatrix} (F^{-1})^t$$

[Equation 5]

Herein, $$\alpha_t = \frac{\sigma_t^2}{\sigma_e^2}.$$

Meanwhile, there is a tendency that $\rho$ is selected as $\rho \to 1$, in the present invention, the case of $\rho = 1$ is considered for simplicity. A precision matrix Q is defined as $Q = C^{-1}$, and this may be written as Equation 6 below.

$$Q = \frac{1}{\sigma_e^2} \cdot \begin{bmatrix} 1+\frac{\sigma_e^2}{\sigma_\epsilon^2} & -1 & & & & & & & \\ -1 & 2 & -1 & & & & & & \\ & \ddots & \ddots & \ddots & & & & & \\ & & -1 & 2 & -1 & & & & \\ & & & -1 & 1+\frac{1}{1+\alpha_t} & -\frac{1}{1+\alpha_t} & & & \\ & & & & -\frac{1}{1+\alpha_t} & \frac{2}{1+\alpha_t} & -\frac{1}{1+\alpha_t} & & \\ & & & & & \ddots & \ddots & \ddots & \\ & & & & & & -\frac{1}{1+\alpha_t} & 1+\frac{1}{1+\alpha_t} & -1 \\ & & & & & & & -1 & 2 & -1 \\ & & & & & & & & \ddots & \ddots & \ddots \\ & & & & & & & & & -1 & 1 \end{bmatrix}$$

[Equation 6]

Generally, variance $\sigma_\epsilon^2$ of an initial value is greater than noise variance $\sigma_e^2$. Accordingly, the first component $$1 + \frac{\sigma_e^2}{\sigma_\epsilon^2}$$

of Q approximates to 1.

Figure 14:
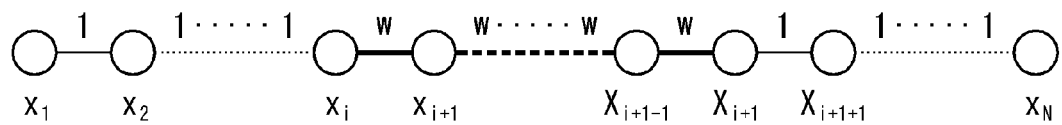
FIG. 14 illustrates a 1-dimensional line graph having a weak link weight for a ramp from $X_i$ to $X_{i+L}$, as an embodiment to which the present invention is applied.

FIG. 14 illustrates a 1-dimensional line graph having a weak link weight for a ramp from $X_i$ to $X_{i+L}$, as an embodiment to which the present invention is applied.

When a 1-dimensional signal of length N is given by a sloped edge between pixel positions i and i+l, a signal may be represented by using the line graph shown in FIG. 14.

When it is allocated that weight w for a ramp edge is $$\frac{1}{1+\alpha_t} = \frac{1}{1+\sigma_t^2/\sigma_e^2},$$

Laplacian matrix L may be equivalent to Q approximately in Equation above. Since precision matrix $Q \approx L$ and covariance matrix c shares the same eigen vector set, the eigen matrix U indicating the EA-GBT may be optimal, and the eigen matrix U may be obtained through Equation 2 above.

In the present invention, it may be assumed that noise variance $\sigma_e^2$ is 1, and parameter $\sigma_r^2$ may be predicted sample variance $\hat{\sigma}_r^2$ of pixel gradient $$\{|f_i-f_{i+1}|,|f_{i+1}-f_{i+2}|,\ldots,|f_{i+l-1}-f_{i+l}|\}$$

extracted from the detected ramp edges.

An intra-prediction residual signal and an inter-prediction residual signal may have different edge property. According to a statistical observation, whereas an intra-prediction residual signal has edges of smooth transition typically, an inter-prediction residual signal has sharper transitions particularly in the case that there is a block mismatch.

According to the present invention, in order to determine an optimal edge model for an intra-prediction residual signal and an inter-prediction residual signal, a modeling is performed according to the graph learning process as represented below.

Residual signal $f \in \mathbb{R}^N$ may be modeled preferentially according to Gaussian Markov Random Field (hereinafter, referred to as 'GMRF') as represented Equation 7 below $$p(f \mid Q) = \frac{1}{(2\pi)^{N/2}|Q|^{-1/2}} \exp\left(-\frac{1}{2} f^t Q f\right) \quad \text{[Equation 7]}$$

Here, Q represents a precision matrix. And, the AR model described in the present disclosure may be an example of the GMRF model. The optimal precision matrix in Equation 7 above may be calculated as Equation 8 below by solving the maximum likelihood problem.

$$Q = \underset{Q \in \Gamma}{\operatorname{argmax}} \log|Q| - Tr(QS) \quad \text{[Equation 8]}$$

Herein, S denotes a sample covariance of residual signal f, and $\Gamma$ may be determined according to a matrix type and graph connectivity constraint as a set including all possible cases that Q may have.

In Equation 8 above, an objective function is derived by taking a natural logarithm of likelihood term in Equation 7 above.

According to the present invention, Sobel edge detector may be applied for identifying a position of a step edge, and the Sobel edge detector may identify a position of ramp edges of width 2 on training frames collected from 8 residual video sequences of HEVC.

For simplicity, a training set may be constructed by extracting only column/row in each block, and it may be assumed that each column/row has only one detected edge component in the center. Accordingly, by solving the maximum likelihood problem of Equation 8 above for the training set which is collected from an intra-prediction residual signal and an inter-prediction residual signal, an optimal graph structure may be derived, which best represents the edge information.

When column/row in a block is represented as $[x_1, x_2, \ldots, x_8]$ in the case that a block size is 8×8, an example of detailed factors for generating a training set is as below.

First, positions of a ramp and a step may be identified by using an edge detector.

Second, a training set to which a graph learning is applied may be determined as below. When a step edge is existed between $x_4$ and $x_5$ and it is obtained a training set for the case that a center of a ramp edge is positioned in $x_4$, set S may be constructed by column/row having a step edge positioned between $x_4$ and $x_5$, and set R may be constructed by column/row having a ramp between $x_3$ and $x_5$, and the corresponding training set may be determined through $S \cap R$.

The optimal graphs derived through the Equation above having the training set to which the graph learning is applied for an intra-prediction residual signal and an inter-prediction residual signal may be identified in FIG. 15 below.

Figure 15:
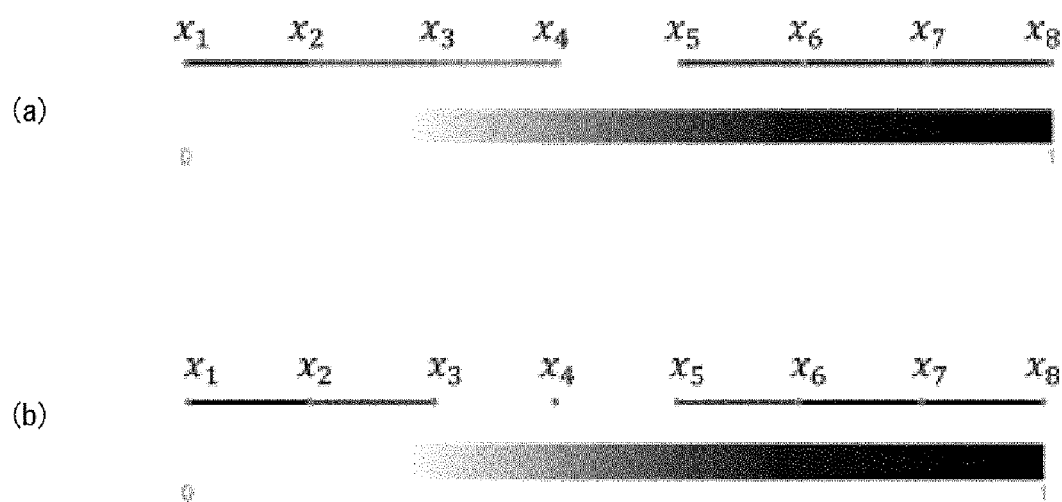
FIG. 15 illustrates an optimal line graph learned from 1-dimensional sample extracted from an inter-prediction residual signal and an intra-prediction residual signal, as an embodiment to which the present invention is applied.

FIG. 15 illustrates an optimal line graph learned from 1-dimensional sample extracted from an inter-prediction residual signal and an intra-prediction residual signal, as an embodiment to which the present invention is applied.

In FIG. 15, the maximum link weights are regulated by 1 for all cases of an inter-prediction residual signal and an intra-prediction residual signal.

As shown in FIG. 15(a), a graph having the step edge model including a single weak link provides more proper model for the edge structure of an inter-prediction residual signal.

On the contrary, as shown in FIG. 15(a), a graph having the ramp edge model may be more proper for the edge structure of an intra-prediction residual signal.

Figure 16:
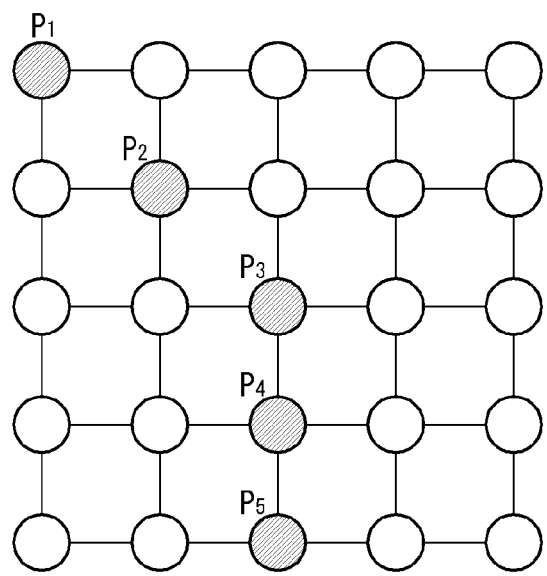
FIG. 16 illustrates a grid graph having a node indicating a center ramp pixel and a contour of consecutive ramp nodes, as an embodiment to which the present invention is applied.
Figure 16:
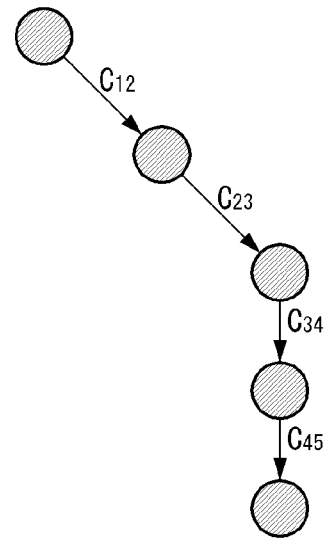

FIG. 16 illustrates a grid graph having a node indicating a center ramp pixel and a contour of consecutive ramp nodes, as an embodiment to which the present invention is applied.

Arithmetic Ramp Edge Coding (AREC)

An embodiment of the present invention may use Canny algorithm for ramp edge detection. The Canny algorithm may be described by dividing pre-filtering and differentiation.

First, optimal pre-filter coefficients for a ramp having different widths may be predetermined.

For differentiation, pixels having gradient greater than threshold value T in a pre-filtered image may be detected with a ramp as a center.

In the present invention, an edge detector may be applied vertically and horizontally. The edge detector may calculate two binary maps $B_v$ and $B_h$, which may identify a position of a center pixel for vertical and horizontal ramps.

The present invention proposes Arithmetic Ramp Edge Coding (AREC) for encoding positions of the center ramp pixels.

Referring to FIG. 16(a), when ramp positions $p_1, p_2, \ldots p_n$ are given in binary ramp map $B=B_v|B_h$, a contour may be formed by traveling through neighboring ramp pixels.

Later, as shown in FIG. 16(b), the AREC may be applied for encoding ordered traveling directions $\{c_{1,2}, c_{2,3}, \ldots c_{n-1,n}\}$ arranged between two consecutive pixels.

Hereinafter, a method for performing the AREC is described in more detail.

Figure 17:
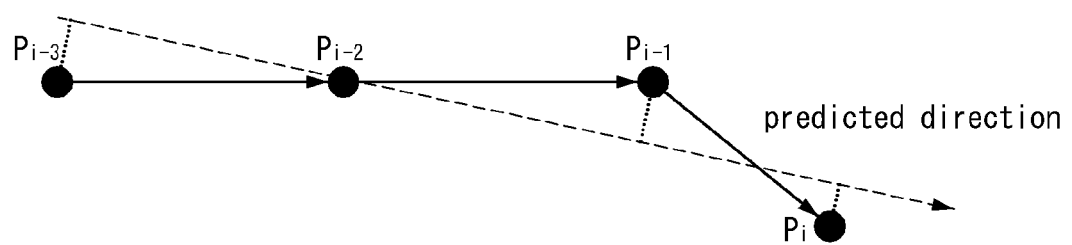
FIG. 17 is a diagram for describing a method for predicting $C_{i-1,i}$ that represents a traveling direction from node $P_{i-1}$ to $P_i$ in the arithmetic ramp edge coding, as an embodiment to which the present invention is applied.

FIG. 17 is a diagram for describing a method for predicting $C_{i-1,i}$ that represents a traveling direction from node $P_{i-1}$ to $P_i$ in the arithmetic ramp edge coding, as an embodiment to which the present invention is applied.

A method for performing the AREC may be described by Table 1 below.

TABLE 1

| | |
|---|---|
| S0 | Input Binary map B with one ramp contour $\{p_1, p_2, \ldots, p_n\}$ |
| S1 | Initialize $p_1$ and traveling direction $c_{0,1}$ |
| | for i = 1 : n − 1 do |
| S2 | Search for $p_{i+1}$ from the 5 possible directions $d_j$ with the priority ordered as {forward, slight right, slight left, right, left} |
| | if i ≤ k then |

TABLE 1-continued

| S3 | Assign equal possibility $\frac{1}{5}$ for $d_j$ |
| --- | --- |
|  | else |
| S4 | Predict the direction of $c_{i-1,i}$ as $\tilde{c}_{i-1,i}$ |
| S5 | Compute the angle $\alpha_j$ between $d_j$ and $\tilde{c}_{i-1,i}$ |
| S6 | Compute the von Mises distribution $\varphi(\alpha_j)$ of angle $\alpha_j$ |
| S7 | Assign the possibility for $d_j$ to be $\dfrac{\varphi(\alpha_j)}{\sum_{r=1}^{5}\varphi(\alpha_r)}$ |
|  | end if |
| S8 | Encode the direction $c_{i,i+1}$ using arithmetic coding with the assigned probability |
|  | end for |

First, it may be assumed that binary ramp map B having lamp positions $p_1, p_2, \ldots p_n$ is given (S0).

Ramp position p1 and traveling direction $C_{0,1}$ may be initialized (S1). And, the following procedure may be performed from i=1 to i=n−1.

Position $p_{i+1}$ of a center ramp pixel may be searched by five possible directions $d_j$ according to a priority (S2). Here, the five possible directions according to a priority may be forward, slight right, slight left, right and left. However, the present invention is not limited thereto, but the number of possible directions may be differently set.

When i≤k, equal possibility ⅕ may be allocated to direction $d_j$ (S3).

Otherwise (i>k), a direction of $C_{i-1,i}$ may be predicted by $$\tilde{C}_i - 1, i. \qquad (S4)$$

In this case, the predicted direction $$\tilde{C}_i - 1, i$$

may be calculated by using a linear regression for pixels $p_{i-k-1}, \ldots, p_{i-1}, p_i$ as shown in FIG. 17.

In addition, angle $\alpha_j$ between the directions $d_j$ and the predicted direction $$\tilde{C}_i - 1, i$$

may be calculated (S5).

Von Mises distribution $\varphi(\alpha_j)$ of the angle $\alpha_j$ may be calculated (S6). Herein, the Von Mises distribution may be defined as Equation 9 below.

$$\varphi(\alpha_j) = \frac{e^{\kappa}\cos(\alpha - \mu)}{2\pi I_0(\kappa)} \qquad \text{[Equation 9]}$$

Herein, $I_0$ denotes Bessel function. For example, when parameters ($\kappa$, $\mu$) are fixed to (2, 0), as angle $\alpha$ approaches to zero, it may be identified that Equation 9 has greater value.

Further, a possibility for the direction $d_j$ may be allocated to be Equation 10 below (S7).

$$\frac{\varphi(\alpha_j)}{\sum_{r=1}^{5}\varphi(\alpha_r)} \qquad \text{[Equation 10]}$$

Later, the direction $d_j$ may be encoded by using arithmetic coding with the allocated probability as described above (S8). Herein, the direction $d_j$ may be called direction information.

Figure 18:
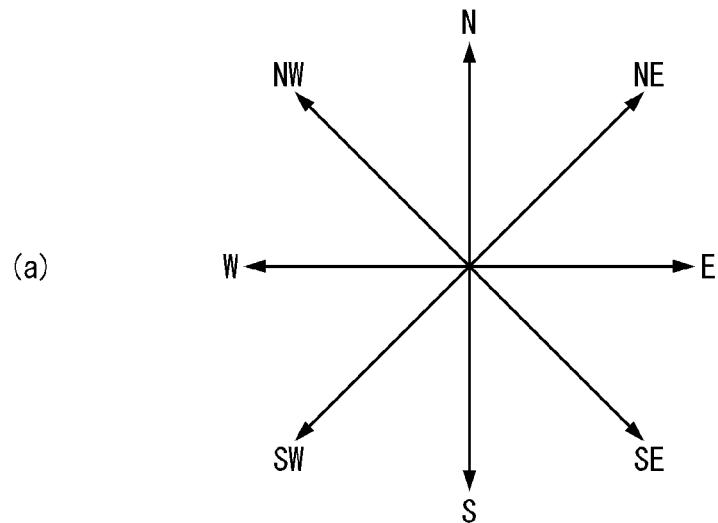
FIG. 18 is a diagram for describing a potential traveling direction from node $P_i$ to $P_{i+1}$ when a previous traveling direction from node $P_{i-1}$ to $P_i$ is given in the arithmetic ramp edge coding, as an embodiment to which the present invention is applied.
Figure 18:
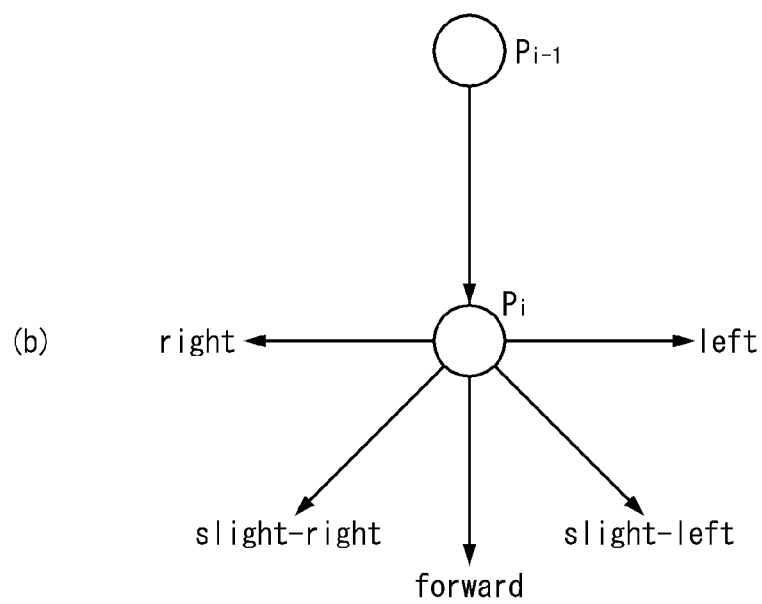

FIG. 18 is a diagram for describing a potential traveling direction from node $P_i$ to $P_{i+1}$ when a previous traveling direction from node $P_{i-1}$ to $P_i$ is given in the arithmetic ramp edge coding, as an embodiment to which the present invention is applied.

FIG. 18(a) illustrates eight possible directions of progress taken by traveling direction $C_{i-1,i}$. For example, the eight possible directions may be {N, NE, E, SE, S, SW, W, NW}.

Meanwhile, assuming that traveling direction $C_{i-1,i}$ from node $P_{i-1}$ to $P_i$ is given and a contour does not include a sharp corner, as shown in FIG. 18(b), traveling direction $C_{i,i+1}$ from node $P_i$ to $P_{i+1}$ may have five possible directions, {forward, slight right, slight left, right, left}.

Figure 19:
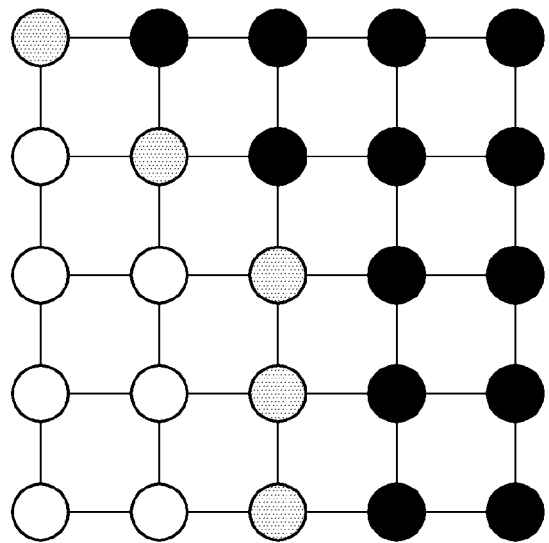
FIG. 19 illustrates an embodiment to which the present invention is applied.
Figure 19:
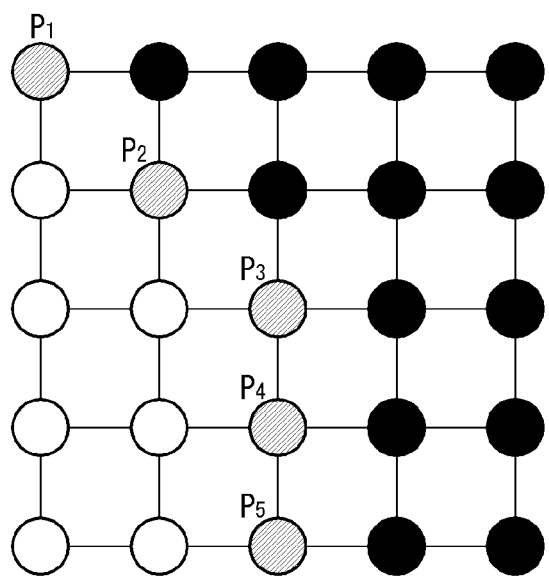

FIG. 19 illustrates an embodiment to which the present invention is applied, FIG. 19(a) illustrates an image block having a ramp structure and FIG. 19(b) illustrates a position (denoted by a dotted line) of a weak link weight predicted from a center ramp pixel.

The number of contours required for encoding binary map $B=B_h|B_v$ of ramp pixels may be decreased by a half in comparison with the number of contours required for encoding Br, and By separately.

However, information of ramp orientations may be lost after Br, and By are combined. In order to construct a graph, by applying a simple technique for predicting ramp orientations, a position of weak links in the graph may be determined.

When a ramp pixel positioned in a 2-dimensional space (i, j), a predictor may identify a neighbor location as represented in Equation 11 below.

$$(m,n)=\{(i-1,j),(i+1,j),(i,j-1),(i,j+1)\} \qquad \text{[Equation 11]}$$

In the case that the neighbor location (m, n) is also a ramp pixel location existed in the same contour, a link weight between (i, j) and (m, n) may be set to 1. Otherwise, the link may correspond to a link in the ramps, and a small weight may be allocated.

For example, a simple example of a link prediction is shown in FIG. 19, and the dotted line shown in FIG. 19(b) denotes predicted weak links.

FIGS. 20 and 21 illustrate a comparison table of PSNR gain and bit rate decreasing ratio of the EA-GBT based on a step function and the EA-GBT based on a ramp function in comparison with the DCT with respect to an inter-prediction residual signal or an intra-prediction residual signal, as an embodiment to which the present invention is applied.

In an embodiment of the present invention, the EA-GBT is applied to six test sequences {BQMall, BasketballDrill, City, Crew, Harbour, Soccer}. It is assumed that the inter-prediction residual signal or the intra-prediction residual signal are generated using HEVC standard in QP=32, and a block size for transform coding is fixed to 8×8 and 16×16.

The encoder system to which the present invention is applied may be the same as shown in FIG. 7 described above.

As shown in FIG. 7, according to an embodiment of the present invention, the performance of hybrid EA-GBT/DCT encoder is compared with the ramp edge model and the step edge model for a DCT based encoder. As an encoder of hybrid EA-GBT/DCT encoder, the present system may select an optimal transform through Rate-Distortion cost optimization. Here, the Rate-Distortion cost optimization is as represented in Equation 12 below.

$$SSE + \lambda \cdot \text{bitrate, where } \lambda = 0.85 \cdot 2^{(QP-12)/3} \quad \text{[Equation 12]}$$

As an embodiment of the present invention, QP=24, 26, 28, 30, 32 and 34 may be used, and 4-connected graph may be used for representing each block. For the step edge detection, Sobel operator may be used, and for the ramp edge detection, the same Sobel operator may be used for a pre-filtered block having a fixed ramp width of 2.

In addition, a pixel having a gradient greater than a threshold value may be selected as a step edge or a ramp edge. For the blocks encoded by the EA-GBT, edge locations may be encoded and signaled as overhead. For example, for the step edge, Arithmetic Edge Coding may be used, and for the ramp edge, the AREC may be used.

Furthermore, in order to decrease overhead cost, only one contour may be allowed in each block. The EA-GBT coefficient and the DCT coefficient may be quantized and entropy-encoded.

Referring to FIG. 20 and FIG. 21, for an inter-prediction residual signal or an intra-prediction residual signal, it may be identified PSNR gain and bit rate decreasing ratio of the EA-GBT based on a step function and the EA-GBT based on a ramp function in comparison with the DCT.

Referring to FIG. 21, for an inter-prediction residual signal, it may be identified that the EA-GBT having the ramp edge model is better than the EA-GBT having the step edge model.

In addition, it may be identified that the EA-GBT results of the step edge model and the ramp edge model surpass the DCT based encoder, and bit rate of about 3.5% and 2.5% is reduced in an inter-prediction residual signal or an intra-prediction residual signal. This is caused by the fact that the edge structure is more dominant for greater blocks as a size of a transform block increases, and accordingly, the performance of the EA-GBT may be improved.

The experimental result of the present invention is just an example, but the numerical conditions described in each embodiment of the present disclosure do not limit the present invention.

The embodiments described in the present disclosure describe based on an encoder mainly, but the present invention is not limited thereto. Each of the functional units of the transform unit or the graph-based transform unit may be performed in a decoder as well as an encoder. In this case, in the embodiments, all of the functional units of the transform unit or the graph-based transform unit are not necessarily included in a decoder, but only a part may be included. Otherwise, information stored exterior may be used or information predefined in encoder/decoder may be used.

As described above, the embodiments explained in the present invention may be implemented and performed in a processor, a microprocessor, a controller or a chip. For example, the functional modules explained in FIGS. 1, 2, 5 to 7 and 11 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus, and may be used to code video signals and data signals.

Furthermore, the decoding/encoding method to which the present invention is applied may be produced in the form of a program to be executed by a computer, and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a blue ray disk (BD), a USB, ROM, RAM, CD-ROM, a magnetic tape, a floppy disk, and an optical data storage device, for example. Furthermore, the computer-readable recording median includes media implemented in the form of carrier waves (e.g., transmission through the Internet). Furthermore, a bit stream generated by the encoding method may be stored in a computer-readable recording medium or may be transmitted over a wired/wireless communication network.

INDUSTRIAL APPLICABILITY

The exemplary embodiments of the present invention have been disclosed for illustrative purposes, and those skilled in the art may improve, change, replace or add various other embodiments within the technical spirit and scope of the present invention disclosed in the attached claims.

The invention claimed is:

1. A method for encoding a video signal based on an Edge Adaptive Graph-Based Transform (EA-GBT), comprising:
   detecting, by a processor, a step edge or a ramp edge from a residual signal;
   generating, by the processor, a graph signal based on at least one of the step edge or the ramp edge;
   obtaining, by the processor, an EA-GBT coefficient by performing the EA-GBT for the graph signal;
   quantizing, by the processor, the EA-GBT coefficient; and
   entropy-encoding, by the processor, the quantized EA-GBT coefficient,
   wherein the step of generating the graph signal includes:
   searching a center ramp pixel having a gradient greater than a threshold value;
   initializing a position of the center ramp pixel;
   searching the position of the center ramp pixel with five possible directions according to a priority;
   allocating a probability for each of direction information; and
   encoding the direction information with the allocated probability,
   wherein the direction information represents a direction of progress between two consecutive pixels.

2. The method of claim 1,
wherein the graph signal is generated based on the step edge when the residual signal is an inter-prediction residual signal.

3. The method of claim 1,
wherein the graph signal is generated based on the ramp edge when the residual signal is an intra-prediction residual signal.

4. The method of claim 1, further comprising:
determining a mode index corresponding to the EA-GBT; and
entropy-encoding the mode index.

5. The method of claim 4, further comprising:
obtaining a DCT coefficient by performing a DCT for the residual signal; and
comparing Rate-Distortion (RD) cost of the DCT coefficient with RD cost of the EA-GBT coefficient,
wherein when the RD cost of the EA-GBT coefficient is smaller than the RD cost of the DCT coefficient, a mode index corresponding to the EA-GBT is determined.

6. A method for decoding a video signal based on an Edge Adaptive Graph-Based Transform (EA-GBT), comprising:
extracting, by a processor, a residual signal, a position of a center ramp pixel and a mode index from the video signal;
deriving, by the processor, the EA-GBT corresponding to the mode index based on the position of the center ramp pixel;
performing, by the processor, an inverse transform for the residual signal based on the EA-GBT; and
generating, by the processor, a reconstructed signal by adding the inverse-transformed residual signal and a prediction signal.

7. The method of claim 6, wherein the EA-GBT is generated based on the step edge when the residual signal is an inter-prediction residual signal.

8. The method of claim 6, wherein the EA-GBT is generated based on the ramp edge when the residual signal is an intra-prediction residual signal.

9. An apparatus for encoding a video signal based on an Edge Adaptive Graph-Based Transform (EA-GBT), comprising:
a processor configured to:
detect at least one of a step edge or a ramp edge from a residual signal;
generate a graph signal based on at least one of the step edge or the ramp edge;
obtain an EA-GBT coefficient by performing the EA-GBT for the graph signal;
quantize the EA-GBT coefficient; and
entropy-encode the quantized EA-GBT coefficient,
wherein the processor is further configured to:
search a center ramp pixel having a gradient greater than a threshold value;
initialize a position of the center ramp pixel;
search the position of the center ramp pixel with five possible directions according to a priority;
allocate a probability for each of direction information; and
encode the direction information with the allocated probability;
wherein the direction information represents a direction of progress between two consecutive pixels.

10. An apparatus for decoding a video signal based on an Edge Adaptive Graph-Based Transform (EA-GBT), comprising:
a processor configured to:
extract a residual signal, a position of a center ramp pixel and a mode index from the video signal;
derive the EA-GBT corresponding to the mode index based on the position of the center ramp pixel;
perform an inverse transform for the residual signal based on the EA-GBT; and
generate a reconstructed signal by adding the inverse-transformed residual signal and a prediction signal.

* * * * *